(12) United States Patent
Ooi et al.

(10) Patent No.: US 7,477,848 B2
(45) Date of Patent: Jan. 13, 2009

(54) OPTICAL RECEIVING APPARATUS AND METHOD FOR CONTROLLING THE OPTICAL RECEIVING APPARATUS

(75) Inventors: Hiroki Ooi, Kawasaki (JP); Akira Miura, Kawasaki (JP); Takeshi Hoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 403 days.

(21) Appl. No.: 11/301,325

(22) Filed: Dec. 13, 2005

(65) Prior Publication Data
US 2007/0047964 A1 Mar. 1, 2007

(30) Foreign Application Priority Data
Aug. 26, 2005 (JP) ............................. 2005-246697

(51) Int. Cl.
H04B 10/00 (2006.01)
(52) U.S. Cl. ........................ 398/147; 398/148; 398/149; 398/158; 398/159; 398/155; 398/161; 398/162; 398/202; 398/208; 398/209; 398/81; 398/102; 398/213; 398/214; 385/24; 385/37; 385/27; 385/11; 385/15
(58) Field of Classification Search ................. 398/147, 398/148, 149, 158, 159, 155, 161, 162, 202, 398/208, 209, 213, 214, 81, 102, 204, 205, 398/206, 189, 198, 27, 33; 385/24, 37, 27, 385/11, 15
See application file for complete search history.

(56) References Cited
U.S. PATENT DOCUMENTS 5,717,510 A 2/1998 Ishikawa et al.
6,081,360 A 6/2000 Ishikawa et al.

7,266,311 B2 * 9/2007 Haunstein et al. ........... 398/209

(Continued)

FOREIGN PATENT DOCUMENTS

JP 621891 1/1994

(Continued)

OTHER PUBLICATIONS

Sano, A. et al. "Automatic dispersion equalization by monitoring extracted-clock power level in a 40-Gbit/s, 200-km transmission line," 22$^{nd}$ European Conference on Optical Communication, Oslo, ECOC 1996, pp. 2.207-2.210.

(Continued)

Primary Examiner—Hanh Phan
(74) Attorney, Agent, or Firm—Hanify & King, P.C.

(57) ABSTRACT

An optical receiving apparatus sets, efficiently and optimally, a delay interferometer and a variable wavelength dispersion compensator in the apparatus. The apparatus has a variable dispersion compensation unit performing variably dispersion compensation on a received optical signal, a delay interference unit performing a delay interference process on the optical signal from the variable dispersion compensation unit, a photoelectric conversion detecting unit performing photoelectric conversion detection on the optical signal from the delay interference unit and outputting an electric signal demodulated from the differential M-ary phase modulated optical signal, a clock signal extracting unit extracting a clock signal from the demodulated electric signal fed from the photoelectric conversion detecting unit, and a dispersion compensation controlling unit controlling a dispersion compensation amount in the variable dispersion compensation unit on the basis of the clock signal extracted by the clock signal extracting unit.

10 Claims, 31 Drawing Sheets

U.S. PATENT DOCUMENTS

| | | | |
|---|---|---|---|
| 7,308,211 B2 * | 12/2007 | Miyazaki | ................... 398/208 |
| 2003/0002112 A1 | 1/2003 | Hirano et al. | |
| 2003/0007216 A1 | 1/2003 | Chraplyvy et al. | |
| 2004/0223769 A1 | 11/2004 | Hoshida | |
| 2005/0047780 A1 | 3/2005 | Hoshida et al. | |

FOREIGN PATENT DOCUMENTS

| | | |
|---|---|---|
| JP | HEI8-321805 | 12/1996 |
| JP | 1188261 | 3/1999 |
| JP | 2000-115077 | 4/2000 |
| JP | 2003-60580 | 2/2003 |
| JP | 200360580 | 2/2003 |
| JP | 200464097 | 2/2004 |
| JP | 2004-516743 | 6/2004 |
| JP | 200580304 | 3/2005 |
| WO | 02/51041 | 6/2002 |

OTHER PUBLICATIONS

Ooi, Hiroki, et al. "40-Gbit/s WDM Automatic Dispersion Compensation with Virtually Imaged Phased Array (VIPA) Variable Dispersion Compensators," IEICE Trans. Commun., vol. E85-B, No. 2, Feb. 2002, pp. 463-469.

Rasmussen, J.C. et al. "Demonstration of Automatic, Simultaneous Compensation of PMD and Chromatic Dispersion in a 44×43Gbit/s Transmission over 6×100km High-PMD SMF," Fujitsu Laboratories Ltd and Fujitsu Higashi-Nihon Digital Technology Ltd., N/D, 2 pgs., 2005.

Japanese Office Action dated Oct. 7, 2008 with English translation.

* cited by examiner (WHEN THERE IS NO SHIFT IN DELAY AMOUNT $\delta$)

(WHEN A SHIFT IN DELAY AMOUNT $\delta$ CORRESPONDS TO A PHASE OF 45°)

(WHEN A SHIFT IN DELAY AMOUNT $\delta$ CORRESPONDS TO A PHASE OF 90°)

(WHEN THERE IS NO SHIFT IN DELAY AMOUNT δ)

(WHEN A SHIFT IN DELAY AMOUNT δ CORRESPONDS TO A PHASE OF 45°)

(WHEN A SHIFT IN DELAY AMOUNT δ CORRESPONDS TO A PHASE OF 90°)

(WHEN THERE IS NO SHIFT δ IN PHASE SHIFT AMOUNT)

(WHEN THERE IS A SHIFT δ IN PHASE SHIFT AMOUNT)

(WHEN THERE IS NO SHIFT δ IN PHASE SHIFT AMOUNT)

(WHEN THERE IS A SHIFT δ IN PHASE SHIFT AMOUNT)

(WHEN THERE IS NO SHIFT δ IN PHASE SHIFT AMOUNT)

(WHEN THERE IS A SHIFT δ IN PHASE SHIFT AMOUNT)

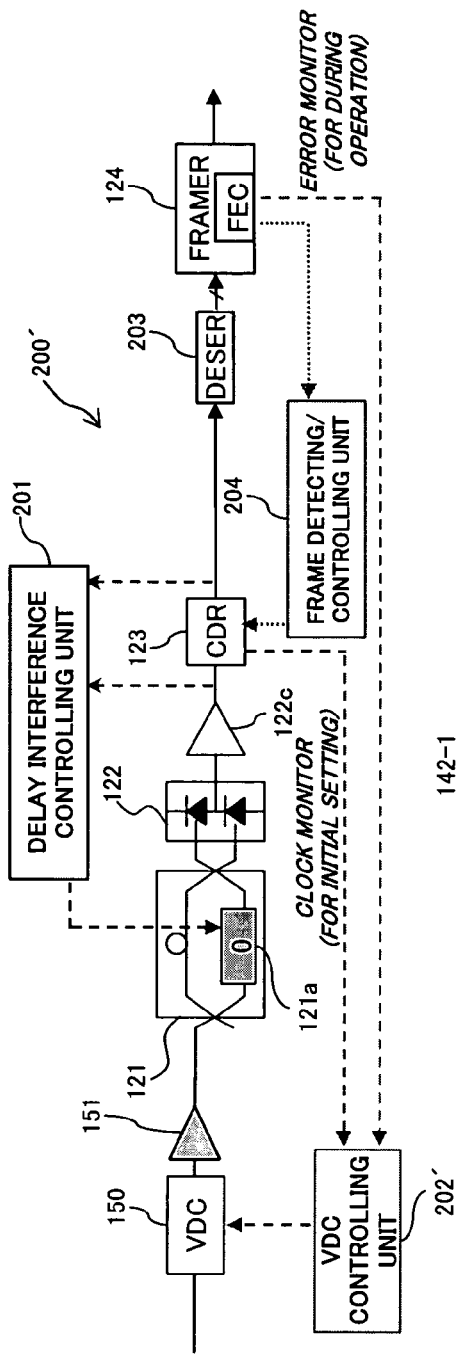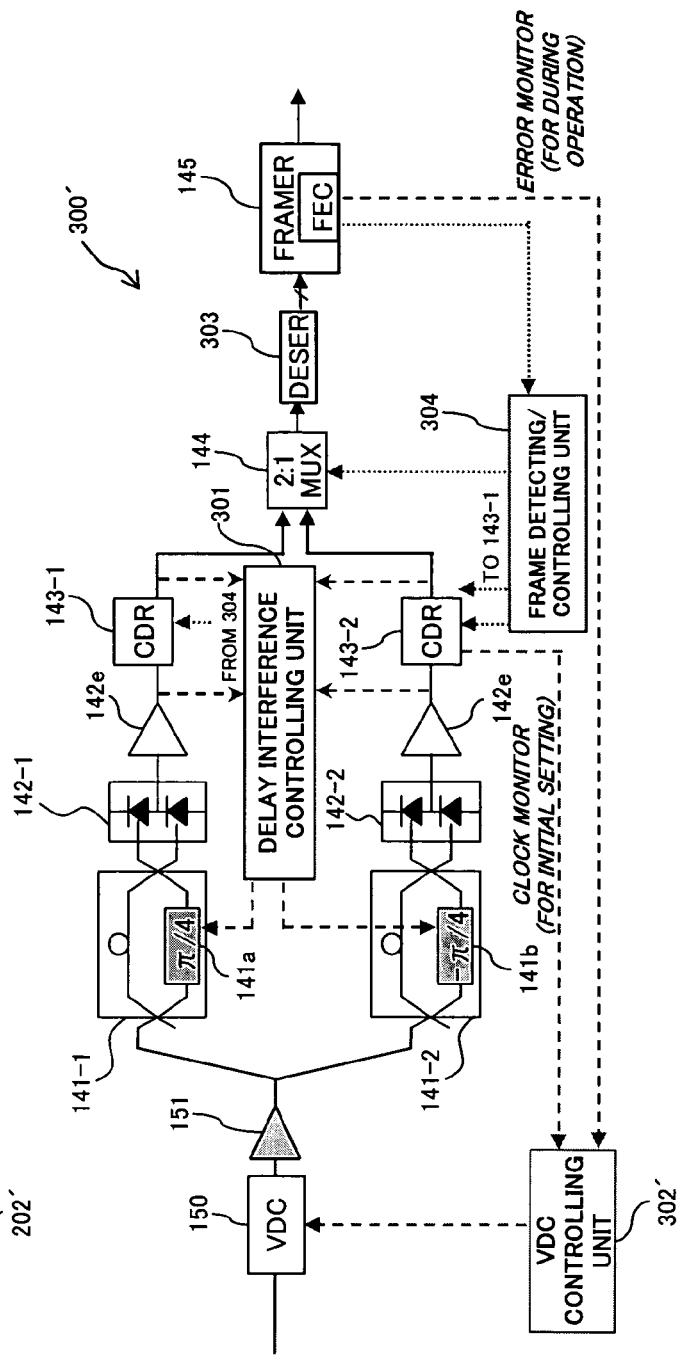
FIG. 19 (A)
FIG. 19 (B)

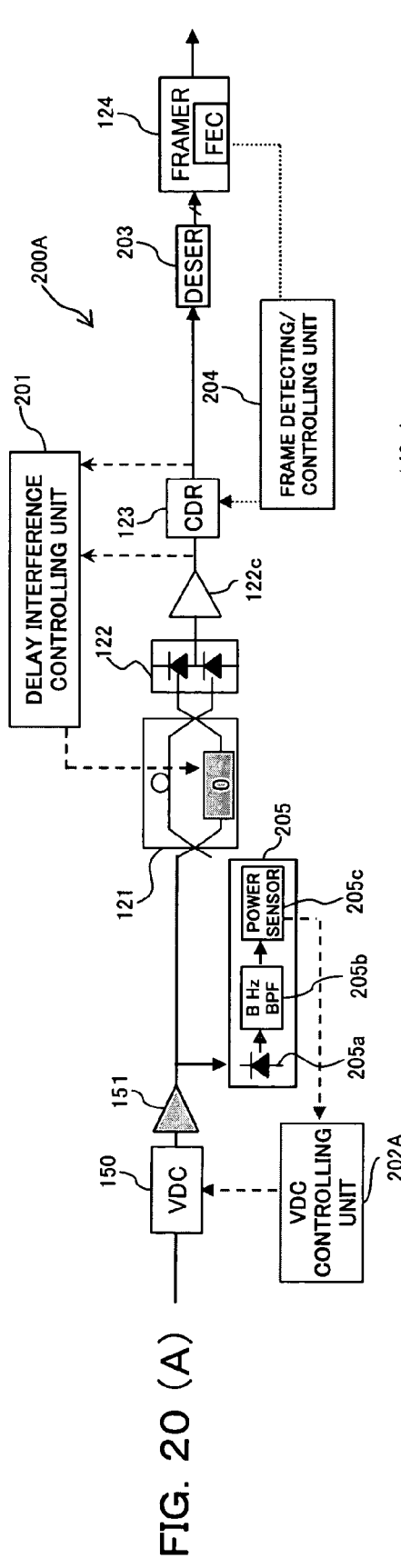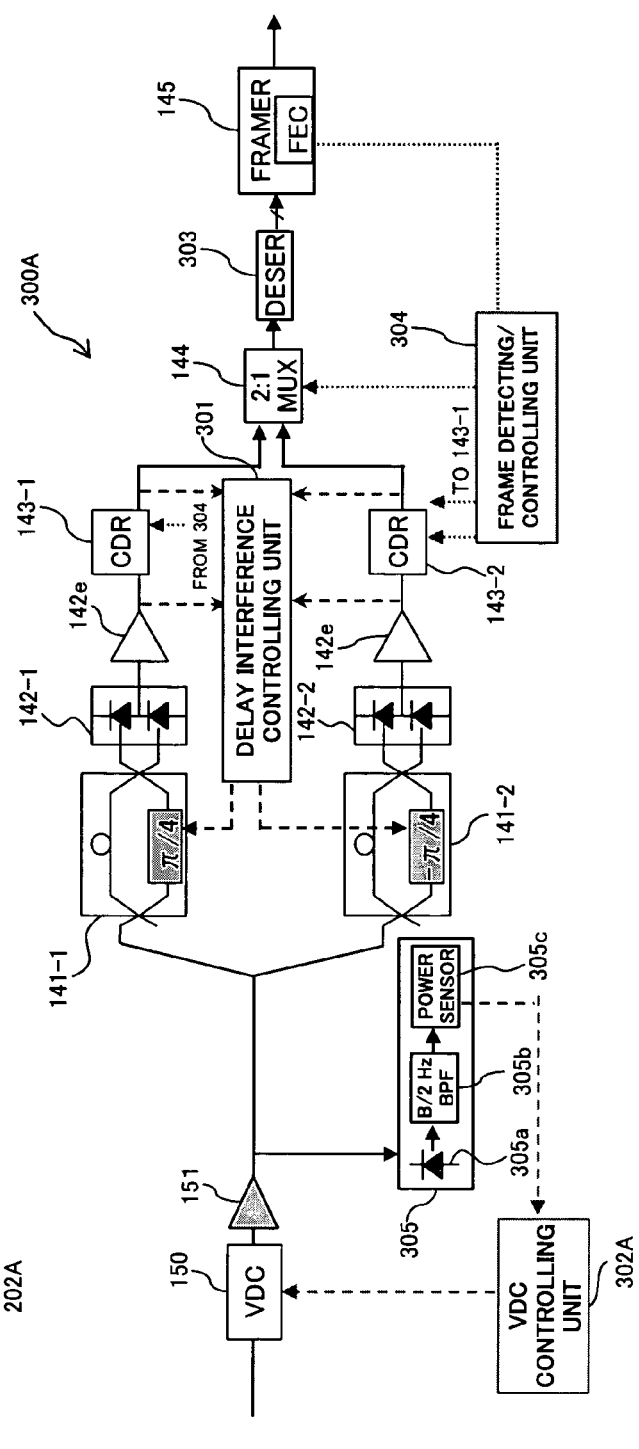
FIG. 20 (A)
FIG. 20 (B)

US 7,477,848 B2

OPTICAL RECEIVING APPARATUS AND METHOD FOR CONTROLLING THE OPTICAL RECEIVING APPARATUS

BACKGROUND OF THE INVENTION

1) Field of the Invention

The present invention relates to an optical receiving apparatus and a method for controlling the optical receiving apparatus suitable for use in an optical transmission system, particularly, an optical transmission system adopting optical phase modulation and demodulation.

2) Background of the Invention

In these years, there is a growing demand for introduction of a 40 Gbit/s optical transmission system in the next generation. In addition, a transmission distance and frequency utilization efficiency equivalent to those of the 10 Gbit/s system are also demanded. RZ-DPSK (Differential Phase Shift Keying) or CSRZ-DPSK, which has excellent optical signal-to-noise ratio (OSNR) tolerance and nonlinearity tolerance as compared with NRZ (Non Return to Zero) employed in known systems of not larger than 10 Gb/s, is being vitally researched and developed as a means meeting the above demands. Besides the above modulation systems, study and development of a phase modulation system such as RZ-DQPSK or CSRZ-DQPSK (Differential Quadrature Phase-Shift Keying) characterized by narrow spectrum (high frequency use efficiency) become vital.

FIG. 30 is a diagram showing an optical transmitting apparatus 110 which adopts RZ-DPSK or CSRZ-DPSK at 43 Gb/s to transmit an optical signal, and an optical receiving apparatus which performs a receiving process such as demodulation and the like on the optical signal modulated in RZ-DPSK or CSRZ-DPSK. When an optical signal is transmitted using RZ-DPSK or CSRZ-DPSK modulation/demodulation system, the optical signal is in a 43 GHz clock waveform as the optical intensity, and information is modulated on binary optical phase.

The optical transmitting apparatus 110 shown in FIG. 30 comprises a transmission data processing unit 111, a CW (Continuous Wave) light source 112, a phase modulator 113 and an RZ pulse-curving intensity modulator 114. The transmission data processing unit 111 has a function as a framer for framing inputted data, a function as an FEC (Forward Error Correction) encoder for giving an error correction code, and a function as a DPSK pre-coder for performing a coding process reflected difference information between a code of the preceding bit and the present code.

The phase modulator 113 modulates a continuous beam from the CW light source 112 with encoded data from the transmission data processing unit 111, and outputs an optical signal in which information is modulated on binary optical phase but whose optical intensity is constant, that is, an optical signal modulated in DPSK, as denoted at A1 and A2 in FIG. 30. The RZ pulse-curving intensity modulator 114 transforms the optical signal from the phase modulator 113 into an RZ pulse. Particularly, an optical signal transformed into an RZ pulse by use of a clock driving signal which is at the same frequency (43 GHz) as the bit rate and has an amplitude one times as large as the extinction voltage (Vπ) is called an RZ-DPSK signal, whereas an optical signal transformed into an RZ pulse by use of a clock driving signal which is at a frequency (21.5 GHz) one half as large as the bit rate and has an amplitude two times as large as the extinction voltage (Vπ) is called a CSRZ-DPSK signal.

The optical receiving apparatus 120 is connected to the optical transmitting apparatus 110 over a transmission path 101 to receive a (CS)RZ-DPSK signal, and performs the receiving process on the signal. The optical receiving apparatus 120 comprises a delay interferometer 121, a photoelectric converting circuit 122, a regenerating circuit 123 and a received data processing unit 124.

The delay interferometer 121 is composed of, for example, a Mach-Zehnder interferometer. The delay interferometer 121 makes one component delayed by one bit time (23.3 ps in this case) and the other component whose phase is controlled to be at 0 radian of the (CS)RZ-DPSK signal transmitted over the transmission path 101 interfere with each other, and provides two outputs as a result of the interference. Namely, one branching waveguide of the Mach-Zehnder Interferometer is formed to have a length longer than the other branching waveguide by a propagation length corresponding to one bit time, and the delay interferometer 121 is provided with an electrode 121a for controlling the phase of the optical signal propagated in the latter branching waveguide.

The photoelectric converting unit 122 is composed of a dual pin photodiode which receives the two outputs from the above delay interferometer 121 to perform balanced detection. The received signal detected by the above photoelectric converting unit 122 is appropriately amplified by an amplifier 122c. The regenerating circuit 123 extracts a data signal and a clock signal from the received signal balanced-detected by the photoelectric converting unit 122. The data processing unit 124 performs signal processing such as error correction and the like on the basis of the data signal and the clock signal extracted by the regenerating circuit 123.

FIG. 31 is a diagram showing an optical transmitting apparatus 130 adopting 43 Gb/s RZ-DQPSK or CSRZ-DQPSK to transmit an optical signal, and an optical receiving apparatus 140 performing the receiving process on the optical signal modulated in RZ-DQPSK or CSRZ-DQPSK. When the optical signal is transmitted and received in RZ-DQPSK or CSRZ-DQPSK modulation/demodulation system, the optical signal has a 21.5 GHz clock waveform as the optical intensity, and information is modulated on quaternary optical phase. Hereinafter, the structure for transmitting and receiving data in the above-mentioned RZ-DQPSK or CSRZ-DQPSK modulation/demodulation system will be schematically described, the details of which are described in Published Japanese Translation of PCT International Publication for Patent Application No. 2004-516743, for example.

The optical transmitting apparatus 130 shown in FIG. 31 comprises a transmission data processing unit 131, a 1:2 demultiplexing (DEMUX) unit 132, a CW (Continuous Wave) light source 133, a π/2 phase shifter 134, two phase modulators 135-1 and 135-2, and an RZ pulse-curving intensity modulator 136.

The transmission data processing unit 131 has functions as a framer and an EFC encoder similar to those of the transmission data processing unit 111 shown in FIG. 30, and a function as a DQPSK precoder for performing an encoding process reflected difference information between a code of the preceding bit and the present code. The 1:2 demultiplexing unit 132 demultiplexes a 43 Gbit/s encoded data from the transmission data processing unit 131 into two sequences of the 21.5 Gbit/s encoded data (data #1 and data #2).

The CW light source 133 outputs a continuous beam. The continuous beam outputted from the CW light source 133 is branched into two, and one beam branched is inputted to phase modulator 135-1, whereas the other branched beam is inputted to the phase modulator 135-2 via the π/2 phase shifter 134. The phase modulator 135-1 modulates the continuous beam from the CW light source 133 with the encoded data (data #1) in one sequence demultiplexed by the 1:2 demultiplexing unit 132, and outputs an optical signal in which information is modulated on binary optical phase (at 0 radian or π radian).

The phase modulator 135-2 is inputted a continuous beam obtained by shifting the phase of the continuous beam from the CW light source by only π/2 by means of the π/2 phase shifter 134, modulates the inputted continuous beam with encoded data (data #2) in the other sequence demultiplexed by the 1:2 demultiplexing unit 132, and outputs an optical signal in which information is modulated on binary optical phase (at π/2 radian or 3π/2 radian).

The modulated beams from the above phase modulators 135-1 and 135-2 are combined, and outputted to the RZ pulse-curving intensity modulator 136 in the following stage. Namely, the modulated beams from the phase modulators 135-1 and 135-2 are combined, whereby an optical signal, in which the optical intensity is constant but information is modulated on quaternary optical phase, that is, an optical signal modulated in DQPSK, can be outputted, as denoted at B1 and B2 in FIG. 31.

Like the RZ pulse-curving intensity modulator denoted by a reference character 114 in FIG. 30, the RZ pulse-curving intensity modulator 136 transforms the optical signal obtained by combining the modulated beams from the phase modulators 135-1 and 135-2 into an RZ pulse. Particularly, an optical signal transformed into an RZ pulse by use of a clock driving signal which is at the same frequency (21.5 GHz) as the bit rate and has an amplitude one times as large as the distinction voltage (Vπ) is called an RZ-DQPSK signal, whereas an optical signal transformed into an RZ pulse by use of a clock driving signal which is at a frequency (10.75 GHz) one half of the bit rate and has an amplitude two times as large as the distinction voltage (Vπ) is called a CSRZ-DQPSK signal.

The optical receiving apparatus 140 is connected to the optical transmitting apparatus 130 over a transmission path 101 to perform received signal processing on a (CS)RZ-DQPSK signal from the optical transmitting apparatus 130. The optical receiving apparatus 140 comprises a branching unit 147 for branching the received optical signal, together with delay interferometers 141-1 and 141-2, photoelectric converting units 142-1 and 142-2, and regenerating circuits 143-1 and 143-2 along the optical signal paths branched by the branching unit 146. The optical receiving apparatus 140 further comprises a multiplexing unit (2:1 MUX) 144 for multiplexing data signals regenerated by the regenerating circuits 143-1 and 143-2, and a received data processing unit 145.

Signals obtained by branching the (CS)RZ-DQPSK signal transmitted over the transmission path 101 are inputted to the delay interferometers 141-1 and 141-2. The delay interferometer 141-1 makes a component delayed by one bit time (46.5 ps in this case) and a component whose phase is controlled to be at π/4 radian interfere with each other, and outputs two results of the interference. The delay interferometer 141-2 makes a components delayed by one bit time and a component whose phase is controlled to be at −π/4 radian (shifted by π/2 from the phase in the delay interferometer 141-1) interfere with each other, and outputs two results of the interference.

Each of the delay interferometers 141-1 and 141-2 may be composed of a Mach-Zehnder interferometer. One of the branching waveguides of each of the Mach-Zehnder interferometers is formed to have a length longer than the other branching waveguide by a propagation length corresponding to one bit time, and each of the delay interferometers 141-1 and 141-2 has an electrode 141a or 141b for controlling the phase of an optical signal propagated in the latter branching waveguide.

The photoelectric converting unit 142-1 is composed of a dual pin photodiode for performing balanced detection by receiving the two outputs from the delay interferometer 141-1. Similarly, the photoelectric converting unit 142-2 is composed of a dual pin photodiode for performing balanced detection by receiving the two outputs from the delay interferometer 141-2. Received signals detected by the above photoelectric converting units 142-1 and 142-2 are appropriately amplified by amplifiers 142e.

The regenerating circuit 143-1 regenerates I (In-phase) components of a clock signal and a data signal from the optical signal received by the photoelectric converting unit 142-1. The regenerating circuit 143-2 regenerates Q (Quadrature-phase) components of a clock signal and a data signal from the optical signal received by the photoelectric converting unit 142-2.

The multiplexing unit 144 is inputted the IQ components of the clock signals and the data signals from the regenerating circuits 143-1 and 143-2 to convert them into a 43 Gbit/s data signal before modulated in DQPSK. On the basis of the data signal from the multiplexing unit 144, signal processing such as error correction and the like is performed in the received data processing unit 145.

In the above (CS)RZ-D(Q)PSK modulation/demodulation system, in order to convert a phase modulated signal into an intensity modulated signal in the optical receiving apparatus 120 or 140, the delay interferometer 121, or 141-1 and 141-2 gives a delay difference of one bit time to the signal to cause optical interference. To obtain a desired optical signal in the delay interferometer 121, or 141-1 and 141-2 at this time, it is necessary to appropriately set the phase of an optical signal to be interfered with a component delayed by one bit time.

For example, RZ-DPSK or CSRZ-DPSK requires that the phase of an optical signal to be interfered with a component delayed by one bit time in the delay interferometer 121 shown in FIG. 30 be set to 0 radian, whereas (CS)RZ-DQPSK requires that the phases of optical signals to be interfered with components delayed by one bit time in the delay interferometers 141-1 and 141-2 be set to π/4 and −π/4 radians, respectively.

Other techniques relating to the present invention are described in the following patent documents 1 through 5:

(Patent Document 1) U.S. Patent Application Publication 2004-0223749;

(Patent Document 2) Japanese Unexamined Patent Application Publication No. HEI 8-321805;

(Patent Document 3) Japanese Unexamined Patent Application Publication No. 2000-115077;

(Patent Document 4) Japanese Unexamined Patent Application Publication No. 2003-60580; and (Patent Document 5) Published Japanese Translation of PCT International Publication for Patent Application No. 2004-516743

In 40 Gb/s or 43 Gb/s transmission, the above optical receiving apparatus is required to have a severe wavelength dispersion tolerance such as about 1/16 of that at the time of 10 Gb/s transmission. For this, it is necessary to provide a variable chromatic dispersion compensator (VDC) 150 at the receiving end as shown in FIGS. 30 and 31 to perform highly accurate dispersion compensation.

In such case, it is necessary to optimally set both the phase control in the delay interferometer and a dispersion compensation amount in the variable dispersion compensator. Namely, when an optical signal undergone CS(RZ)-D(Q)

PSK is received, it is necessary to optimally set both the delay interferometer and the variable dispersion compensator in order to demodulate the modulated optical signal.

For dispersion compensation, it is assumed that the number of errors is monitored, using the number of error corrections relating to the received signal decoded, and the variable dispersion compensator is controlled on the basis of the number of monitored errors.

However, the characteristics of the dispersion compensation amount and the characteristics of the phase control amount with respect to the number of errors are different in nature, and the control amounts in both the delay interferometer and the variable dispersion compensator are shifted from the optimum values in the stage of initial setting. For this, there is a problem that a long time is required to search optimum control amounts for both the delay interferometer and the variable dispersion compensator to obtain good quality of the received signal, which is harm to quickly stabilize the control amounts in the delay interferometer and the variable dispersion compensator.

Namely, since the number of errors above mentioned varies according to the optical phase control by the delay interferometer and the control on the dispersion compensation amount by the variable dispersion compensator, it is difficult to quickly stabilize the control amounts in the both after the initial start of the apparatus.

Further, since the transmission path chromatic dispersion and the optical phase difference in the delay interferometer vary with temperature fluctuation and the like during the system operation, it is necessary to adaptively control the delay interferometer and the variable dispersion compensator. The techniques described in the above patent documents 1 through 5 and other known techniques do not examine the control by both the delay interferometer and the variable dispersion compensator in the phase modulation system.

SUMMARY OF THE INVENTION

In the light of the above problem, an object of the present invention is to set simultaneously the delay interferometer and the variable chromatic dispersion compensator in the optical receiving apparatus, efficiently and optimally, at the time of the initial start (at the time of a start of the system operation, protection and path switching) and during the system operation.

The present invention therefore provide an optical receiving apparatus performing a receiving process on an optical signal undergone differential M-ary phase modulation in which M=$2^n$ where n is a natural number, the optical receiving apparatus comprising a variable dispersion compensation unit for variably performing dispersion compensation on the received optical signal, a delay interference unit for performing a delay interference process on the optical signal from the variable dispersion compensation unit, a photoelectric conversion detecting unit for performing photoelectric conversion detection on the optical signal from the delay interference unit to output a demodulated electric signal demodulated from the differential M-ary phase modulated optical signal, a clock signal extracting unit for extracting a clock signal from the demodulated electric signal fed from the photoelectric conversion detecting unit, and a dispersion compensation controlling unit for controlling a dispersion compensation amount in the variable dispersion compensation unit on the basis of the clock signal extracted by the clock signal extracting unit.

The delay interference unit may perform the delay interference process to make one branched component delayed by one bit of the optical signal from the variable dispersion compensation unit and the other branched component undergone an optical phase control of the same interfere with each other, and the optical receiving apparatus may further comprise a delay interference controlling unit for controlling an optical phase control amount in the delay interference unit on the basis of the demodulated electric signal from the photoelectric conversion detecting unit.

The delay interference controlling unit may control the delay interference process after the dispersion compensation controlling unit starts the control on the variable dispersion compensation unit.

The optical receiving apparatus may further comprise an error monitor for detecting the number of errors from the demodulated electric signal fed from the photoelectric conversion detecting unit, wherein the dispersion compensation controlling unit controls the variable dispersion compensation unit on the basis of the clock signal when an operation of the optical receiving apparatus is started, the delay interference controlling unit controls the delay interference process after the control on the variable dispersion compensation unit is started, and the dispersion compensation controlling unit controls the variable dispersion compensation unit according to the number of errors detected by the error monitor during a steady operation of the optical receiving apparatus.

The optical receiving apparatus may perform the receiving process on an optical signal undergone differential binary phase shift keying, the delay interference unit may branch the optical signal from the variable dispersion compensation unit, delay one component of the branched optical signal by one bit while controlling the other component of the same with an optical phase control amount of zero, and make the branched component delayed by one bit and the branched component controlled with the optical phase control amount of zero interfere with each other, and the delay interference controlling unit may control the delay interference unit on the basis of the demodulated electric signal from the photoelectric conversion detecting unit so that the optical phase control amount is stabilized at zero.

The optical receiving apparatus may perform the receiving process on an optical signal undergone differential quaternary phase shift keying, the delay interference unit may comprise a branching unit for branching the optical signal from the variable dispersion compensation unit into two, a first interferometer for further branching one of the branched optical signals branched by the branching unit into two component, delaying one of the two components by one bit while controlling the other component with an optical phase control amount of $\pi/4$, and making the component delayed by one bit and the component controlled with the optical phase control amount of $\pi/4$ interfere with each other, a second interferometer for further branching the other of the branched optical signal branched by the branching unit into two components, delaying one of the two components by one bit while controlling the other component with an optical phase control amount of $-\pi/4$, and making the component delayed by one bit and the component controlled with the optical phase control amount of $-\pi/4$ interfere with each other, and the delay interference controlling unit may control the first interferometer and the second interferometer on the basis of the demodulated electric signal from the photoelectric conversion detecting unit so that the optical phase control amount in the first interferometer and the optical phase control amount in the second interferometer are stabilized at $\pi/4$ and $-\pi/4$, respectively.

The present invention further provides an optical receiving apparatus for performing a receiving process on an optical signal undergone differential M-ary phase modulation in which $M=2^n$ where n is a natural number, the optical receiving apparatus comprising a variable dispersion compensation unit for variably performing dispersion compensation on the received optical signal, a delay interference unit for performing a delay interference process on the optical signal from the variable dispersion compensation unit, a photoelectric conversion detecting unit for performing photoelectric conversion detection on the optical signal from the delay interference unit to output a demodulated electric signal demodulated from the differential M-ary phase modulated optical signal, an error monitor for detecting the number of errors from the demodulated electric signal fed from the photoelectric conversion detecting unit, a first dispersion compensation controlling unit for controlling the variable dispersion compensation unit to roughly adjust a dispersion compensation amount in the variable dispersion compensation unit when an operation of the optical receiving apparatus is started so that the number of errors detected by the error monitor is below a predetermined value, a first phase controlling unit for roughly adjusting an optical phase control amount in the delay interference unit in association with the adjustment of the dispersion compensation amount performed by the first dispersion compensation controlling unit, a second phase controlling unit for performing a control to stabilize the optical phase control amount in the delay interference unit on the basis of the demodulated electric signal from the photoelectric conversion detecting unit when the number of errors is below the predetermined value, and a second dispersion compensation controlling unit for performing a control on the dispersion compensation amount in the variable dispersion compensation unit after the optical phase control by the second phase controlling unit is started so that the number of errors is minimum.

The present invention still further provides a method for controlling an optical receiving apparatus for performing a receiving process on an optical signal undergone differential M-ary phase modulation in which $M=2^n$ where n is a natural number, the optical receiving apparatus comprising a variable dispersion compensation unit for variably performing dispersion compensation on the received optical signal, a delay interference unit for performing a delay interference process to make one branched component delayed by one bit of the optical signal from the variable dispersion compensation unit and the other branched component undergone an optical phase control of the same interfere with each other, a photoelectric conversion detecting unit for performing photoelectric conversion detection on the optical signal from the delay interference unit to output a demodulated electric signal demodulated from the differential M-ary phase modulated optical signal, a clock signal extracting unit for extracting a clock signal from the demodulated electric signal fed from the photoelectric conversion detecting unit, and an error monitor for detecting the number of errors from the demodulated electric signal fed from the photoelectric conversion detecting unit, the method comprising the steps of controlling a dispersion compensation amount in the variable dispersion compensation unit on the basis of the clock signal extracted by the clock signal extracting unit when an operation of the optical receiving apparatus is started, controlling an optical phase control amount in the delay interference unit on the basis of the demodulated electric signal from the photoelectric conversion detecting unit after the control on the dispersion compensation amount is started, and controlling the dispersion compensation amount in the variable dispersion compensation unit according to the number of errors detected by the error monitor during a steady operation of the optical receiving apparatus.

The present invention still further provides a method for controlling an optical receiving apparatus for performing a receiving process on an optical signal undergone differential M-ary phase modulation in which $M=2^n$ where n is a natural number, the optical receiving apparatus comprising a variable dispersion compensation unit for variably performing dispersion compensation on the received optical signal, a delay interference unit for performing a delay interference process to make one branched component delayed by one bit of the optical signal from the variable dispersion compensation unit and the other branched component undergone an optical phase control of the same interfere with each other, a photoelectric conversion detecting unit for performing photoelectric conversion detection on the optical signal from the delay interference unit to output a demodulated electric signal demodulated from the differential M-ary phase modulated optical signal, and an error monitor for detecting the number of errors from the demodulated electric signal fed from the photoelectric conversion detecting unit, the method comprising the steps of adjusting roughly a dispersion compensation amount in the variable dispersion compensation unit and an optical phase control amount in the delay interference unit so that the number of errors detected by the error monitor is below a predetermined value, starting a control to stabilize the optical phase control amount in the delay interference unit on the basis of the demodulated electric signal from the photoelectric conversion detecting unit when the number of errors is below the predetermined value, and starting a control on the dispersion compensation amount in the variable dispersion compensation unit so that the number of errors is minimum.

In the above case, after an initial value of the optical phase control amount in the delay interference unit is set, a dispersion compensation amount at which the number of errors detected by the error monitor is below the predetermined value may be searched by the variable dispersion compensation unit, and when a dispersion compensation amount at which the number of errors detected by the error monitor is below the predetermined value is not obtained by the variable dispersion compensation unit, the optical phase control amount in the delay interference unit may be increased from the initial value by a predetermined amount at a time until a dispersion compensation amount at which the number of errors detected by the error monitor is below the predetermined value is obtained.

Accordingly, the present invention can provide an advantage that the dispersion compensation controlling unit can set, efficiently and optimally, the variable dispersion compensation unit in the optical receiving apparatus at the time of the initial setting (at the time of a start of the system operation, protection and path switching) and during the system operation. Further, when the delay interference controlling unit for controlling the phase control amount in the delay interference unit is provided, it is possible to quickly stabilize the controls by the delay interference controlling unit and the dispersion compensation controlling unit.

BRIEF DESCRIPTION OF THE DRAWINGS

FIGS. 19(A) and 19(B) are block diagram of optical receiving apparatuses according to modification of the first embodiment;

FIGS. 20(A) and 20(B) are block diagrams showing optical receiving apparatuses to be compared with the optical receiving apparatuses according to the first embodiment;

DESCRIPTION OF THE PREFERRED EMBODIMENTS

Hereinafter, description will be made of embodiments of this invention with reference to the drawings.

Other than the above object of the present invention, another technical problem, a means for solving the problem and its working effect will be apparent from disclosure of the following embodiments.

[A] Description of First Embodiment

Figure 1:
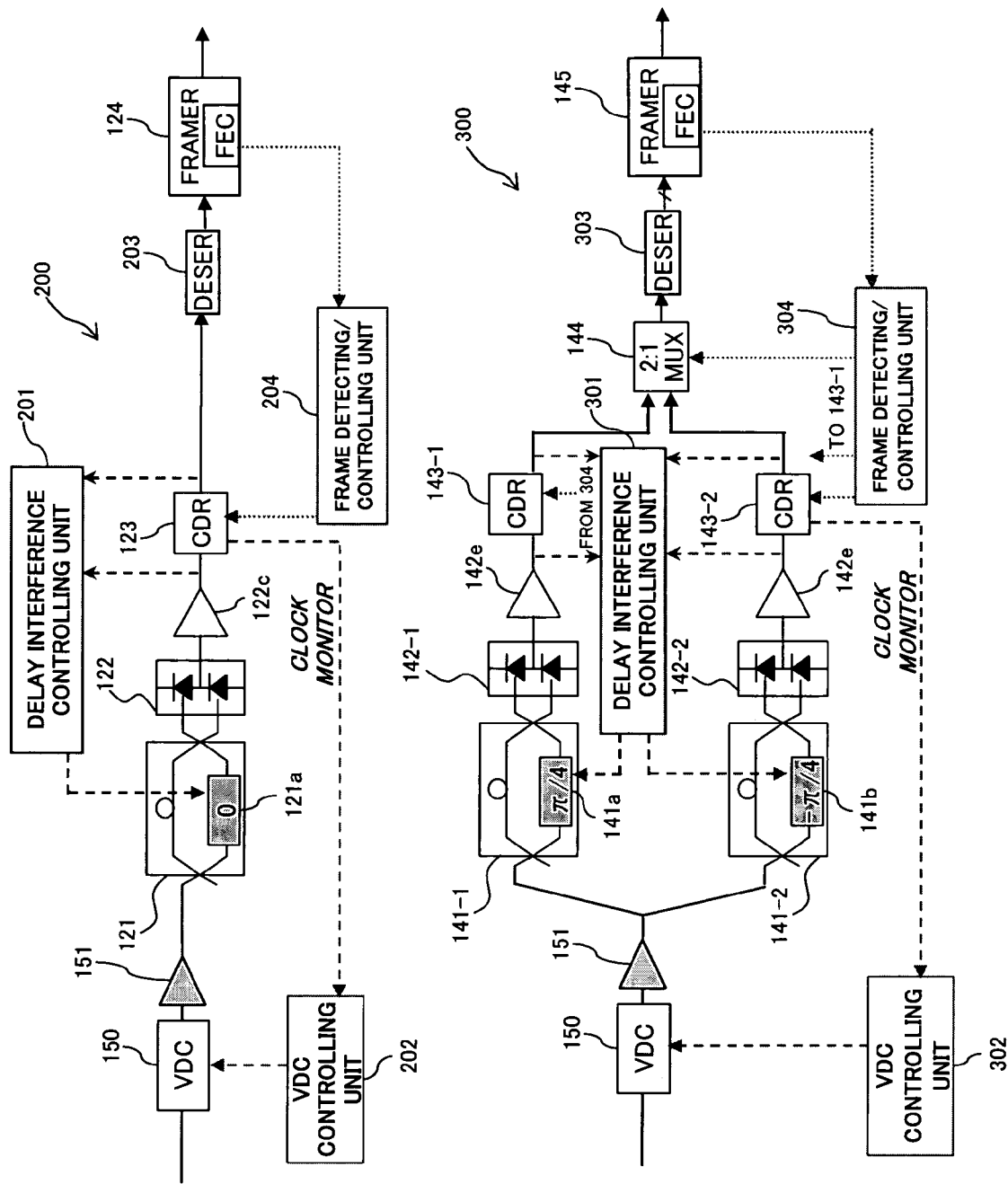
FIGS. 1(A) and 1(B) are block diagrams showing optical receiving apparatuses according to a first embodiment of this invention.

FIGS. 1(A) and 1(B) are diagrams showing optical receiving apparatuses 200 and 300 according to a first embodiment of this invention. The optical receiving apparatus 200 shown in FIG. 1(A) adopts (CS)RZ-DPSK modulation/demodulation system, which is differential binary phase modulation. The optical receiving apparatus 200 is an improvement of the above-mentioned optical receiving apparatus 120 shown in FIG. 30. The optical receiving apparatus 300 shown in FIG. 1(B) adopts (CS)RZ-DQPSK modulation/demodulation system, which is differential quaternary phase modulation. The optical receiving apparatus 300 is an improvement of the above-mentioned optical receiving apparatus 140 shown in FIG. 31.

Figure 30:
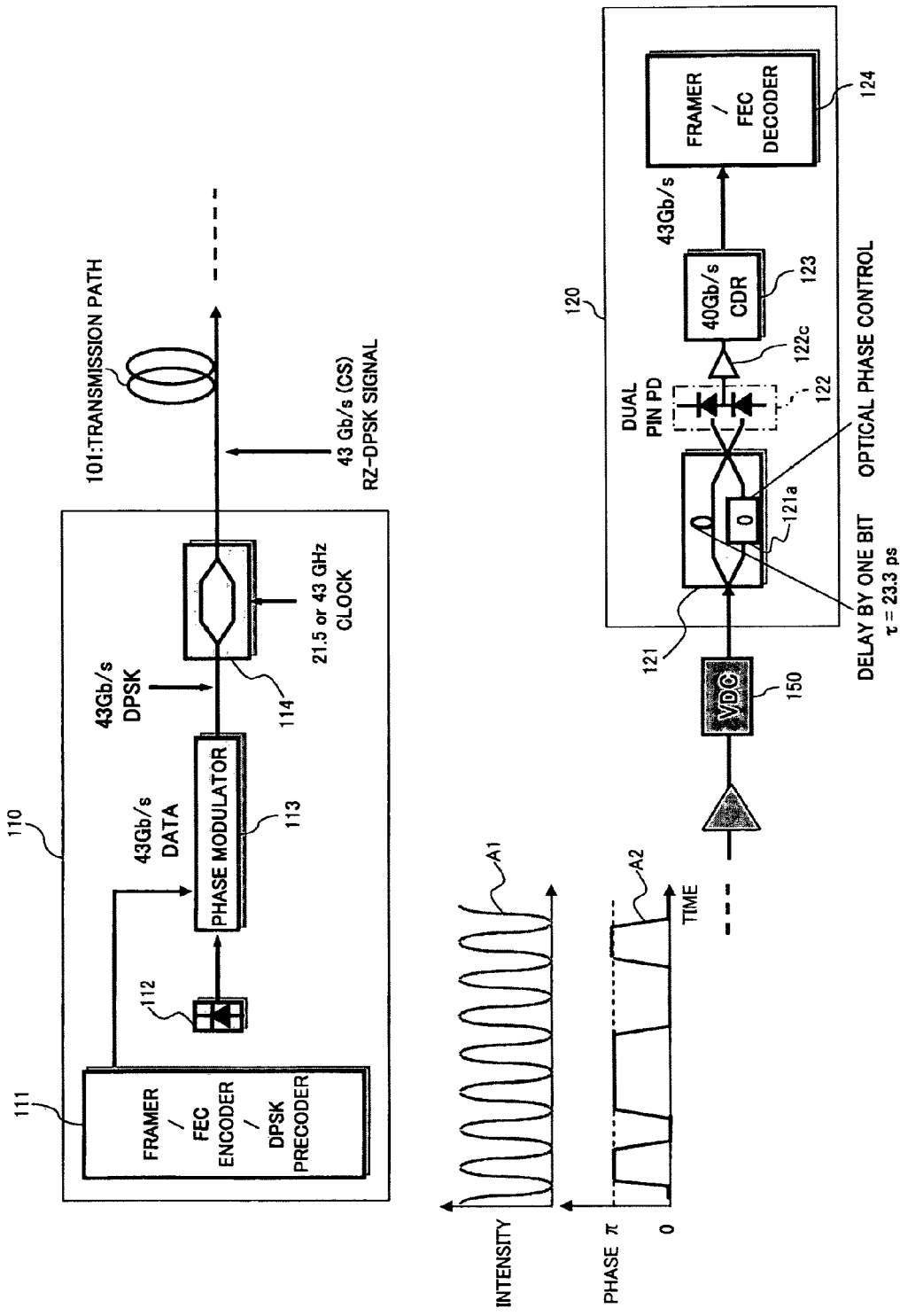
FIGS. 30 and 31 are block diagrams showing known techniques.
Figure 31:
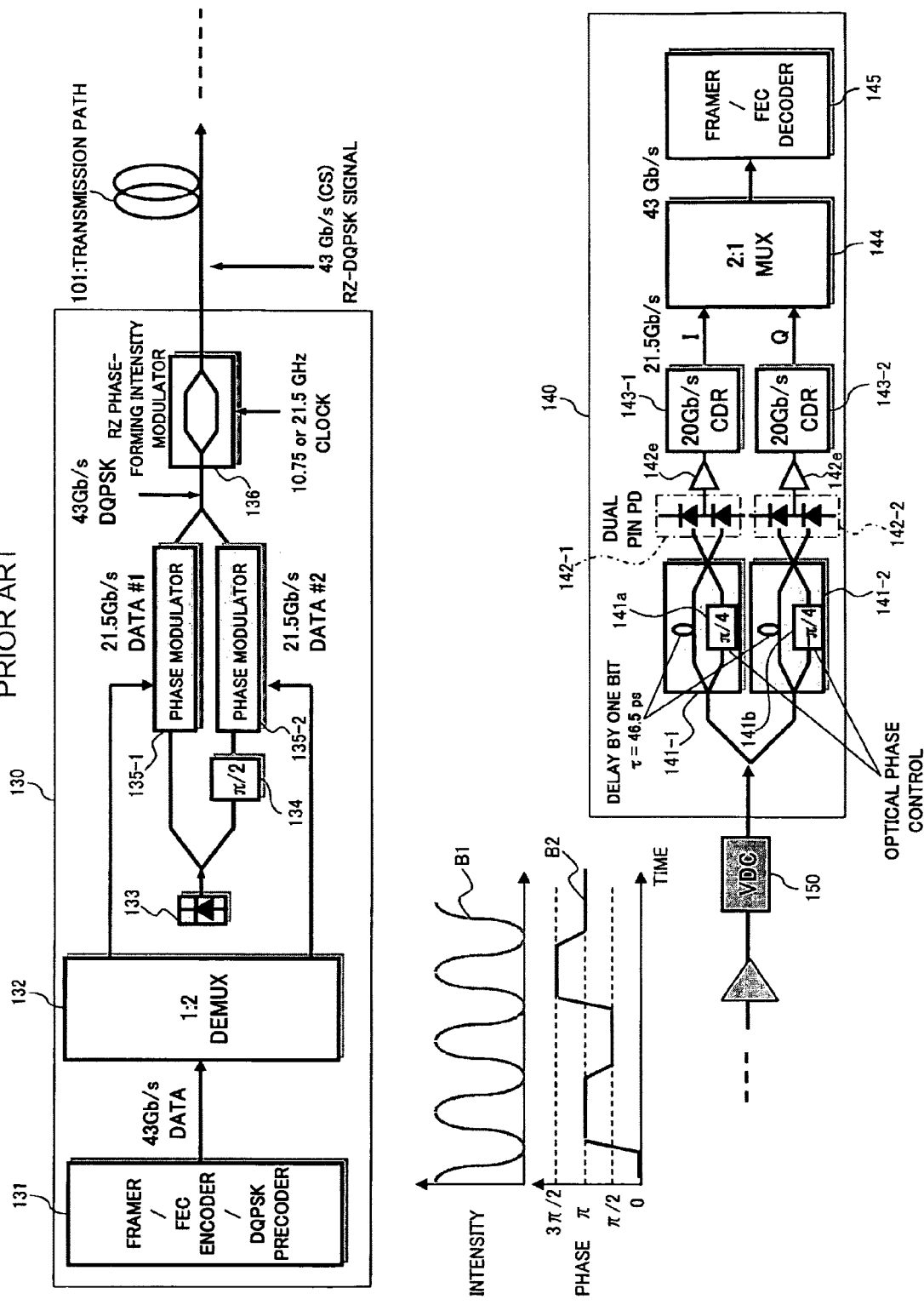

Like the delay interferometer 121 of the optical receiving apparatus 120 shown in FIG. 30, a delay interferometer 121 of the optical receiving apparatus 200 shown in FIG. 1(A) is a delay interference unit for performing a delay interference process on an optical signal from a VDC 150 which performs variable chromatic dispersion compensation. Namely, the delay interferometer 121 branches an optical signal from the VDC 150, delays one of the branched optical signal by one bit, controls the other one with an optical phase control amount of zero, and makes the branched component delayed by one bit and the branched component controlled with an optical phase control amount of zero interfere with each other.

The photoelectric converting unit 122 composed of a dual pin photodiode is a differential photoelectric conversion detecting unit which performs differential photoelectric conversion detection on an optical signal from the delay interferometer 121, and outputs a demodulated electric signal demodulated from the differential binary phase modulated optical signal.

A regenerating circuit 123 has a function as a clock signal extracting unit for extracting a clock signal from the demodulated electric signal fed from the photoelectric converting unit 122, and a function of extracting a data signal. A received data processing unit 124 has a function as an error correction processing unit (error monitor) which performs error correction process on the basis of a regenerated data signal obtained from the demodulated electric signal fed from the photoelectric converting unit 122, and a function as a framer.

A frame detecting/controlling unit 204 detects a frame on the basis of a signal from the received data processing unit 124 to control regeneration of a clock signal and a data signal in the regenerating circuit 124. Incidentally, a deserializer 203 which converts a serial signal into a parallel signal may be suitably provided in the front stage of the received data processing unit 124.

In the optical receiving apparatus 300 shown in FIG. 1(B), a branching unit 146, and delay interferometers 141-1 and 141-2 together function as a delay interference unit for performing a delay interference process on an optical signal from the VDC 150.

The delay interferometer 141-1 is a first interferometer which further branches one optical signal branched by the branching unit 146 into two, delays one of the branched signal by one bit, controls the other one with an optical phase control amount of $\pi/4$, and makes the branched component delayed by one bit and the branched component controlled with an optical phase control amount of $-\pi/4$ interfere with each other. Similarly, the delay interferometer 141-2 is a second interferometer which further branches the other optical signal branched by the branching unit 146 into two, delays one of the branched signal by one bit, controls the other one with an optical phase control amount of $-\pi/4$, and makes the branched component delayed by one bit and the branched component controlled with an optical phase control amount of $\pi/4$ interfere with each other.

The photoelectric converting units 142-1 and 142-2 composed of respective dual pin photodiodes together function as a differential photoelectric conversion detecting unit which performs differential photoelectric conversion detection on optical signals from the delay interferometers 141-1 and 141-2 to output a demodulated electric signal from the differential quaternary phase modulated optical signal.

The regenerating circuits 143-1 and 143-2 together have a function as a clock signal extracting unit which extracts a clock signal from the demodulated electric signal fed from the photoelectric converting units 142-1 and 142-2, and a function of extracting an I component and a Q component of a data signal. The received data processing unit 145 has a function as an error correction processing unit (error monitor) which performs an error correction process on the basis of a regenerated data signal obtained from a demodulated electric signals fed from the photoelectric converting units 142-1 and 142-2, and a function as a framer.

A frame detecting/controlling unit 304 performs frame detection on the basis of a signal from the received data processing unit 145, and controls regeneration of the clock signals and data signals in the regenerating circuits 143-1 and 143-2, and a multiplexing process in the multiplexing unit 144. Incidentally, reference numeral 303 designates a deserializer suitably disposed in the front stage of the received data processing unit 145.

The VDC 150 in each of the optical receiving apparatuses 200 and 300 functions as a variable dispersion compensating unit for performing variably dispersion compensation on a received optical signal, to which a VIPA described in a document, "IEICE transactions B E85-b_2_463, 40-Gbit/s WDM Automatic Dispersion Compensation with Virtually Imaged Phased Array (VIPA) Variable Dispersion Compensators, February 2002," may be applied. Meanwhile, an optical signal from the VDC 150 is suitably amplified by an optical amplifier 151, and supplied to the delay interferometers 121, or 141-1 and 141-2.

The optical receiving apparatus 200 (or the optical receiving apparatus 300) according to the first embodiment has a delay interference controlling unit 201 (301) which controls an optical phase control amount in the delay interferometer 121 (141-1 and 141-2) on the basis of a demodulated electric signal from the photoelectric converting unit 122 (142-1 and 142-2) which is the differential photoelectric conversion detecting unit, and a VDC (dispersion compensation controlling unit) 202 (302) which controls a dispersion compensation amount in the VDC 150 on the basis of a clock signal extracted by the regenerating circuit 123 (143-1 and 143-2) which is the clock signal extracting unit.

Now, the delay interference controlling unit 201 and the VDC controlling unit 202 in the optical receiving apparatus 200 shown in FIG. 1(A) will be first described. The delay interference controlling unit 201 monitors a difference in optical phase between a component delayed by one bit time and an optical signal to be interfered therewith in the delay interferometer 121 from at least either a demodulated electric signal outputted from the photoelectric converting unit 122 or an output signal from the regenerating circuit 123, and controls according to a result of the monitoring so that the difference in optical phase of the optical signal is stabilized at 0 radian.

Figure 2:
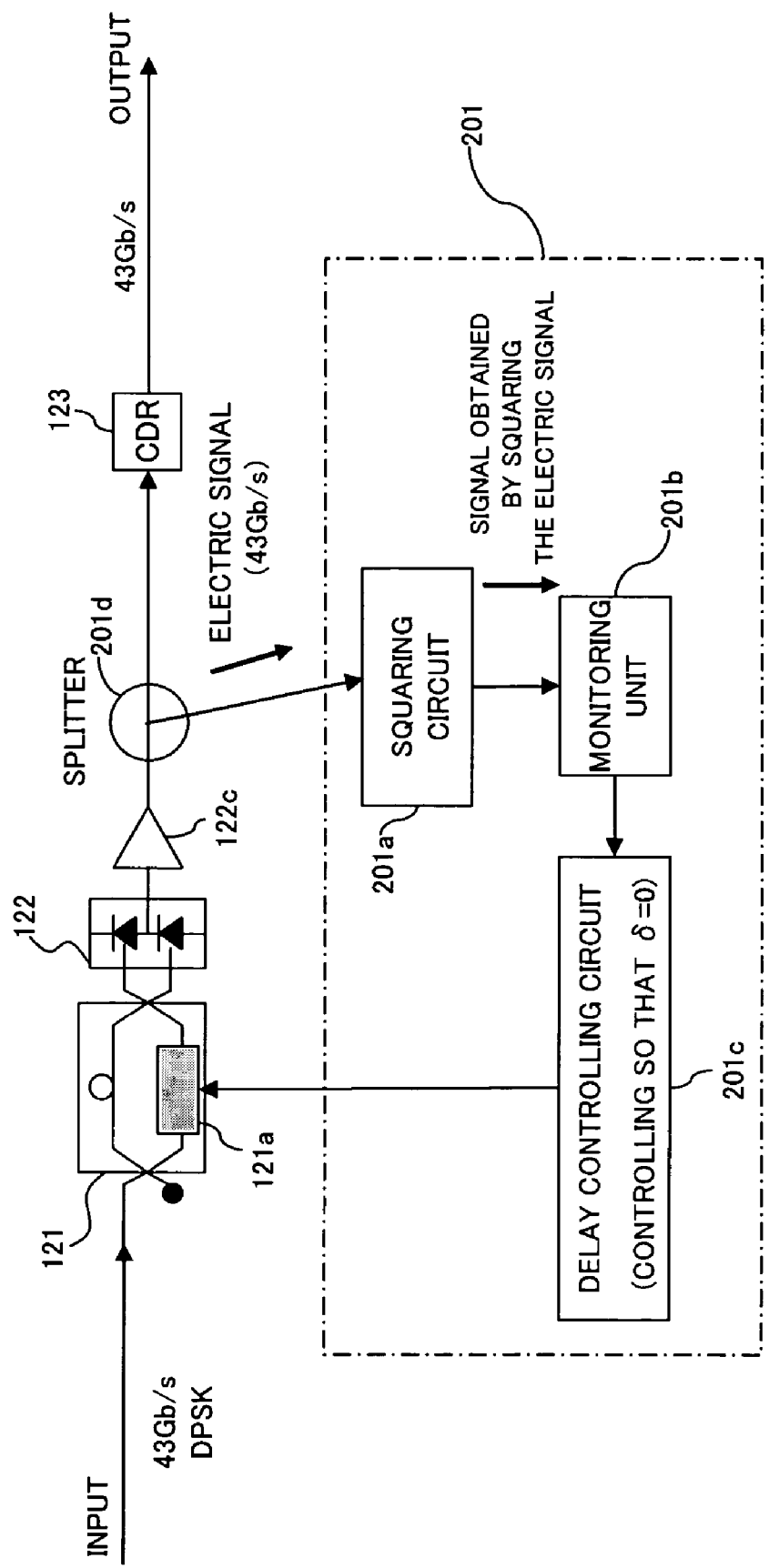
FIG. 2 is a block diagram showing an essential part of the optical receiving apparatus according to the first embodiment.

The delay interference controlling circuit 201 may comprise, as shown in FIG. 2, a squaring circuit 201a, a monitoring unit 201b and a phase shift amount controlling circuit 201c. The squaring unit 201a is inputted a part of the demodulated electric signal outputted from the photoelectric converting unit 122 through a splitter 201d, and squares the demodulated electric signal. The monitoring unit 201b integrates the squared signal from the squaring circuit 201a to obtain an average value thereof.

The phase shift amount controlling circuit 201c controls the phase shift amount (phase control amount) in the delay interferometer 121 according to an average value obtained by the monitoring unit 201b. When the delay interferometer 121 is comprised of a Mach-Zehnder interferometer, for example, an electric field is supplied through an electrode 121a formed along an optical waveguide in which an optical signal whose phase is to be controlled is propagated, thereby to control the phase of the optical signal.

Figure 3A:
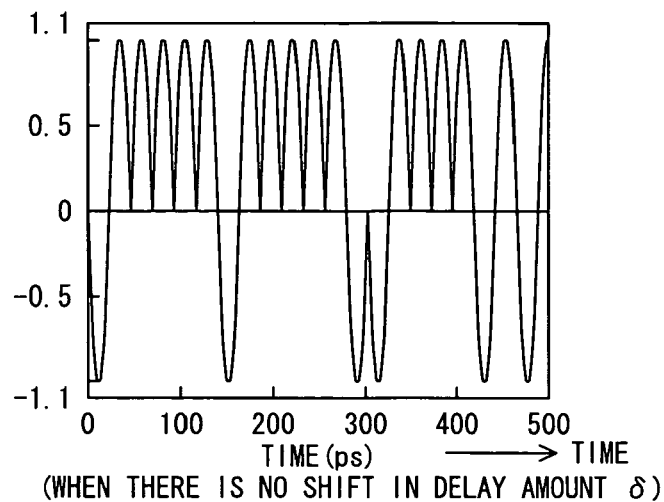
FIGS. 3(A) through 3(C), 4(A) through 4(C), 5, 6(A) and 6(B), 7(A) and 7(B), 8(A) and 8(B), and 9 are diagrams for illustrating working of the essential part of the optical receiving apparatus according to the first embodiment.
Figure 3B:
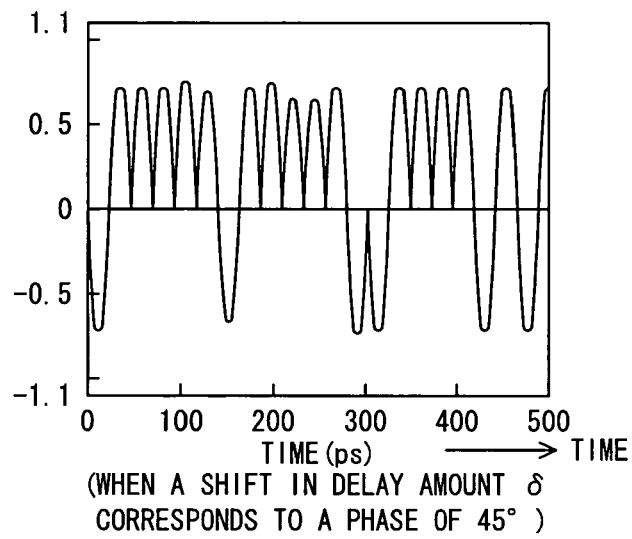
Figure 3C:
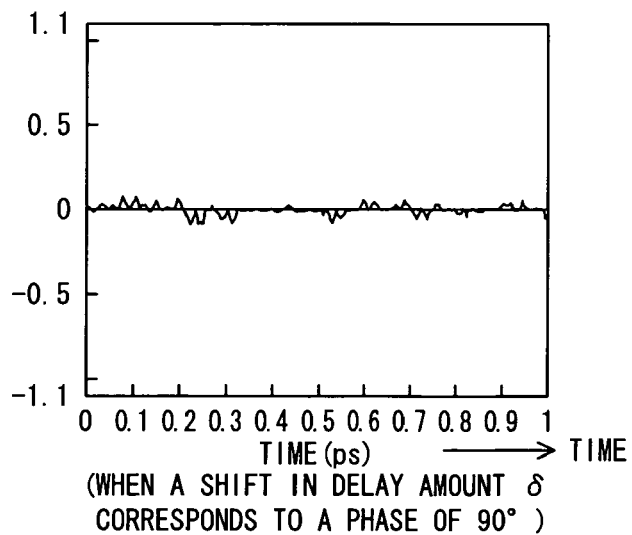
Figure 4A:
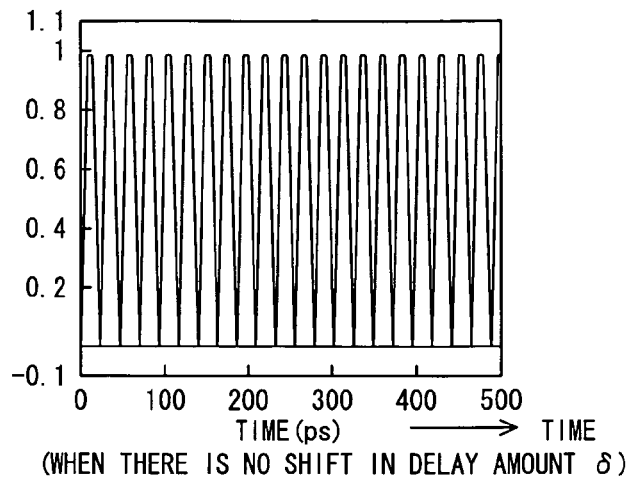
Figure 4B:
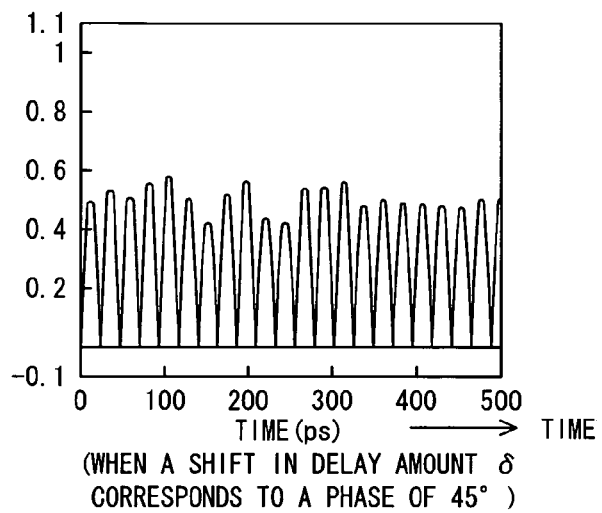
Figure 4C:
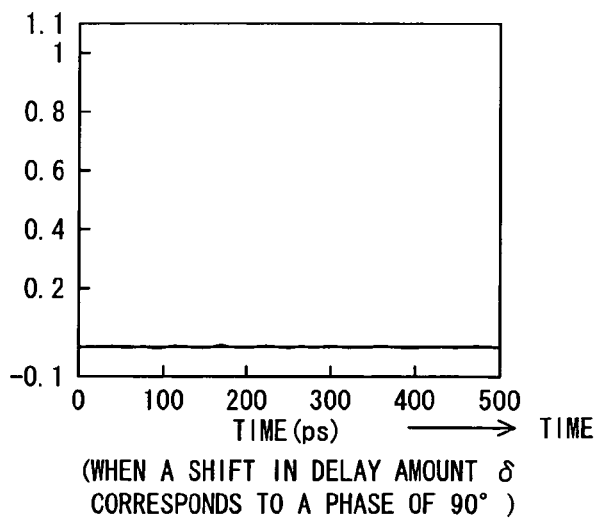

FIGS. 3(A) through 3(C) are diagrams showing waveforms of a demodulated electric signal outputted from the photoelectric converting unit 122. FIGS. 4(A) through 4(C) are diagrams showing waveforms of a squared signal outputted from the squaring circuit 201a. When the phase control amount is appropriately controlled (at 0 radian), amplitudes of the demodulated electric signal and its squared signal are relatively large, as shown in FIGS. 3(A) and 4(A). Accordingly, the average power of the squared signal obtained by the monitoring unit 201b is a relatively large value, in this case.

When a shift occurs in the phase control amount, the amplitudes of the demodulated signal and its squared signal are smaller than those shown in FIGS. 3(A) and 4(A), as shown in FIGS. 3(B) and 4(B) (when a shift of 45 degree occurs), and FIGS. 3(C) and 4(C) (when a shift of 90 degree occurs). In this case, the average power of the squared signal is relatively small.

Figure 5:
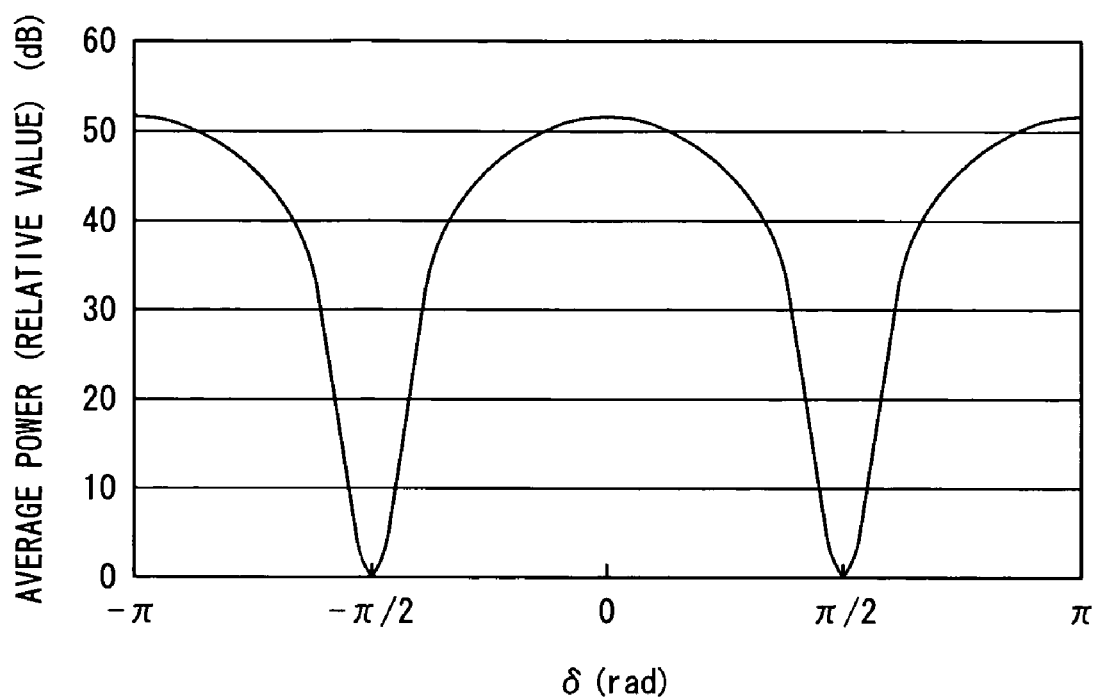

FIG. 5 is a diagram showing a relationship between the shift amount of the phase control amount and the average power of the squared signal. As shown in FIG. 5, when the shift δ of the phase control amount is zero, the average power of the squared signal is the largest. As the "shift amount δ" increases, the average power of the squared signal decreases. However, the average power of the squared signal periodically changes with the "shift amount δ." In order to optimize the phase control amount to 0 radian using the above operational principle, the phase shift amount controlling circuit 201c performs the feed-back control so that the average power of the squared signal obtained by the monitoring unit 201b is the largest.

Since the dispersion compensation controlling unit 202 controls the dispersion compensation amount in the VDC 150 on the basis of the clock signal extracted by the regenerating circuit 123, the dispersion compensation controlling unit 202 can control the dispersion compensation amount to the optimum point without referring to the number of errors (the number of error corrections), as follows.

Figure 6A:
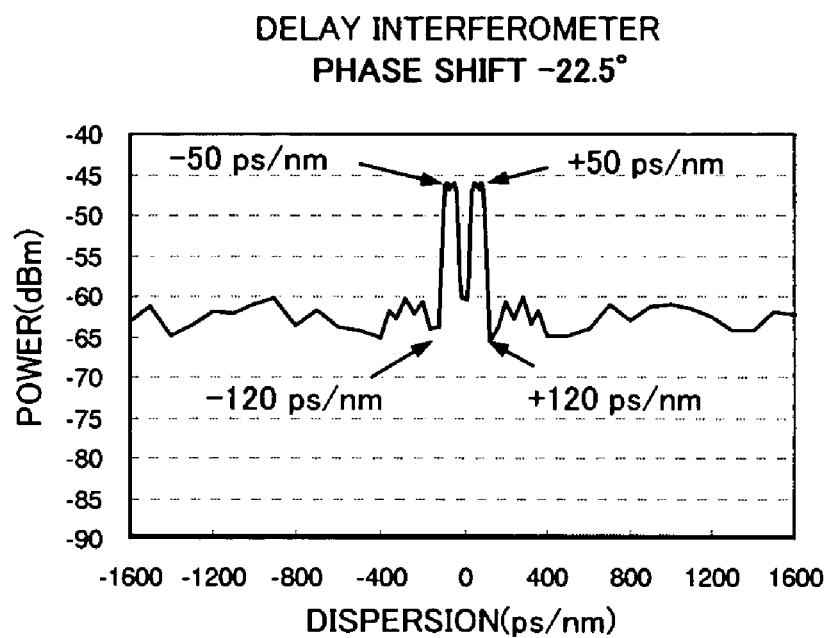
Figure 7A:
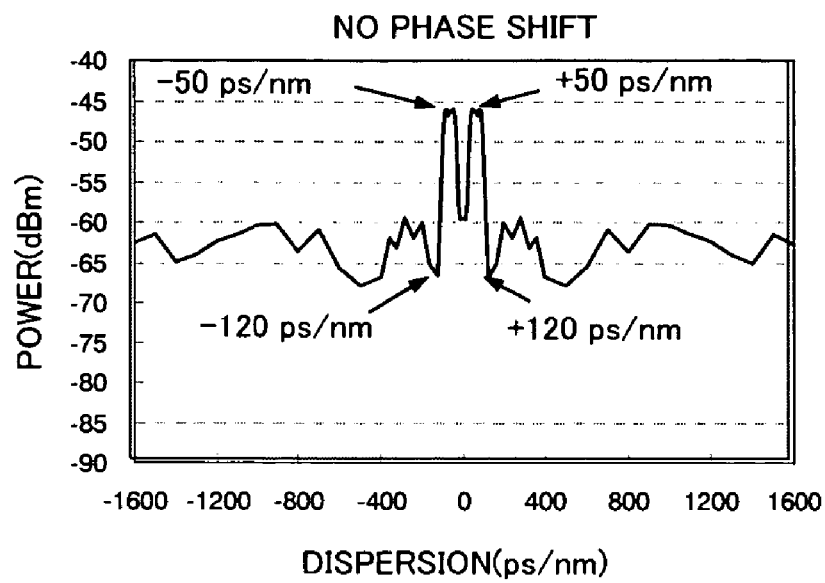
Figure 8A:
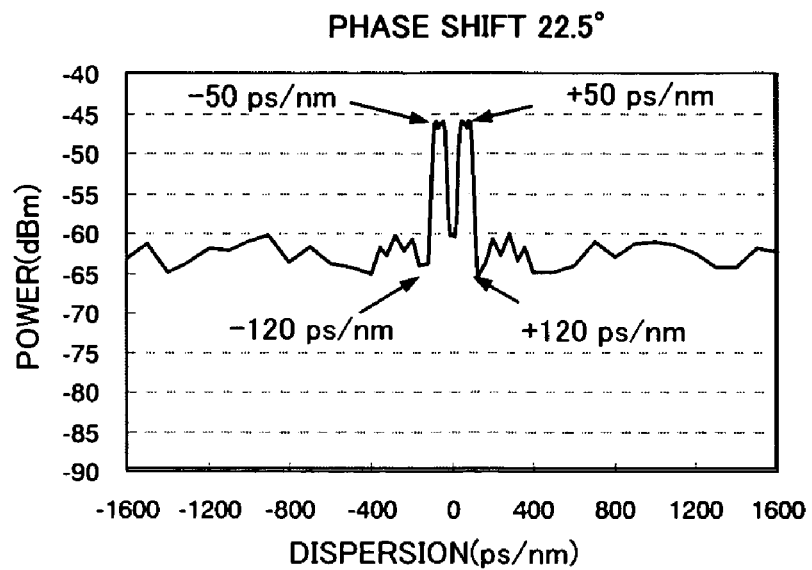

FIGS. 6(A), 7(A) and 8(A) are diagrams showing results of simulation of the clock signal intensity obtained when the dispersion amount in the transmission path 101 is changed. FIG. 6(A) shows a case where the phase shift in the delay interferometer 121 is −22.5 degree, FIG. 7(A) shows a case where the phase shift in the delay interferometer 121 is 0 degree, that is, when there is no phase shift, and FIG. 8(A) shows a case where the phase shift in the interferometer 121 is 22.5 degree.

Figure 6B:
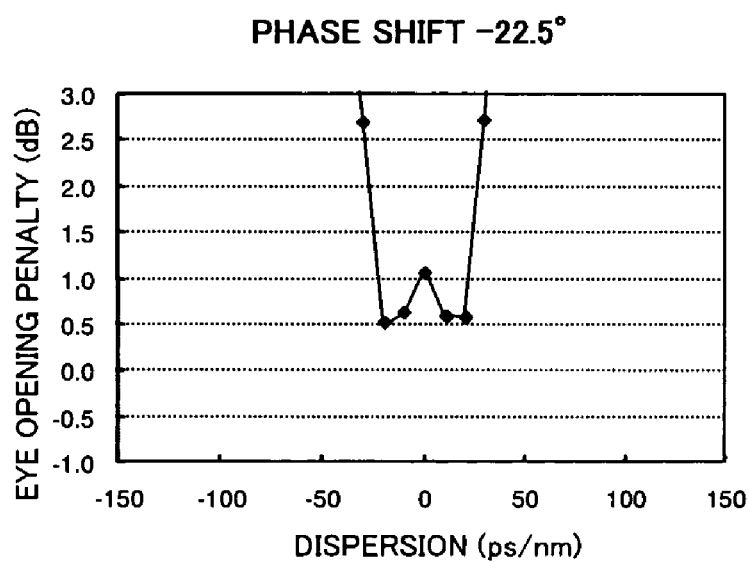
Figure 7B:
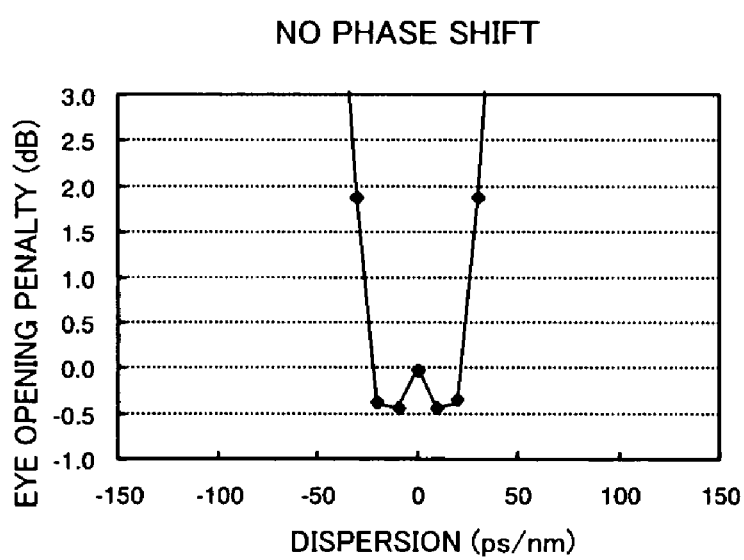
Figure 8B:
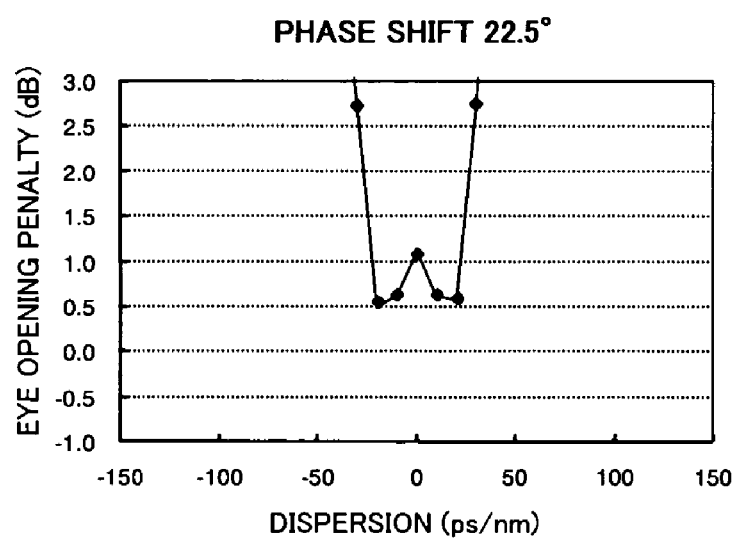

FIGS. 6(B), 7(B) and 8(B) are diagrams showing results of simulation of the eye opening penalty representing the optical signal quality obtained when the dispersion amount in the transmission path 101 is changed. FIG. 6(B) shows a case where the phase shift in the delay interferometer 121 is −22.5 degree, FIG. 7(B) shows a case where the phase shift in the delay interferometer is 0 degree, that is, there is no phase shift, and FIG. 8(B) shows a case where the phase shift in the delay interferometer 121 is 22.5 degree.

Figure 9:
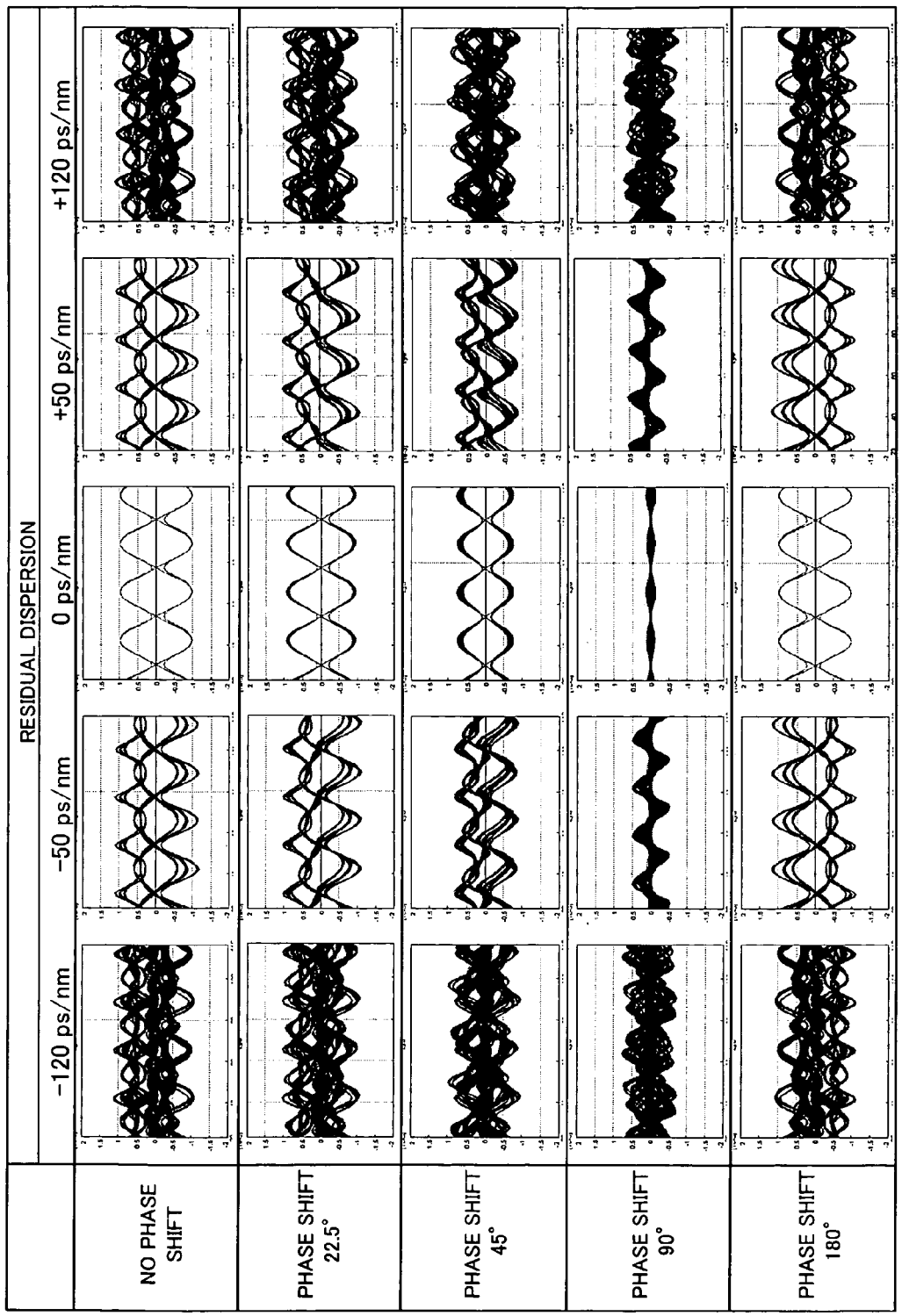

FIG. 9 shows eye patterns of the demodulated electric signal inputted to the regenerating circuit 123 obtained when the phase shift amount in the delay interferometer 121 is at 0, 22.5, 45, 90 and 180 degree correspondingly to the residual dispersion amount. As shown in FIG. 9, it is found that the signal quality is the best when the residual dispersion is 0 ps/nm and there is no phase shift in the delay interferometer (or the phase shift is 180 degree). It is also found that the amplitude of the clock component which changes from the low level to the high level to the low level within one bit is in almost the same pattern irrespective of the phase shift in the delay interference system, but changes according to only the dispersion compensation amount.

As shown in FIGS. 6(B), 7(B) and 8(B), the optical signal quality changes according to the magnitude of the phase control amount shift in the delay interferometer 121. On the other hand, the clock signal intensity extracted by the regenerating circuit 123 has a characteristic that is not dependent on the magnitude of the phase control amount shift in the delay interferometer 121, and has stable peaks at dispersion amounts of +50 ps/nm and −50 ps/nm, as shown in FIGS. 6(A), 7(A) and 8(A).

Figure 10:
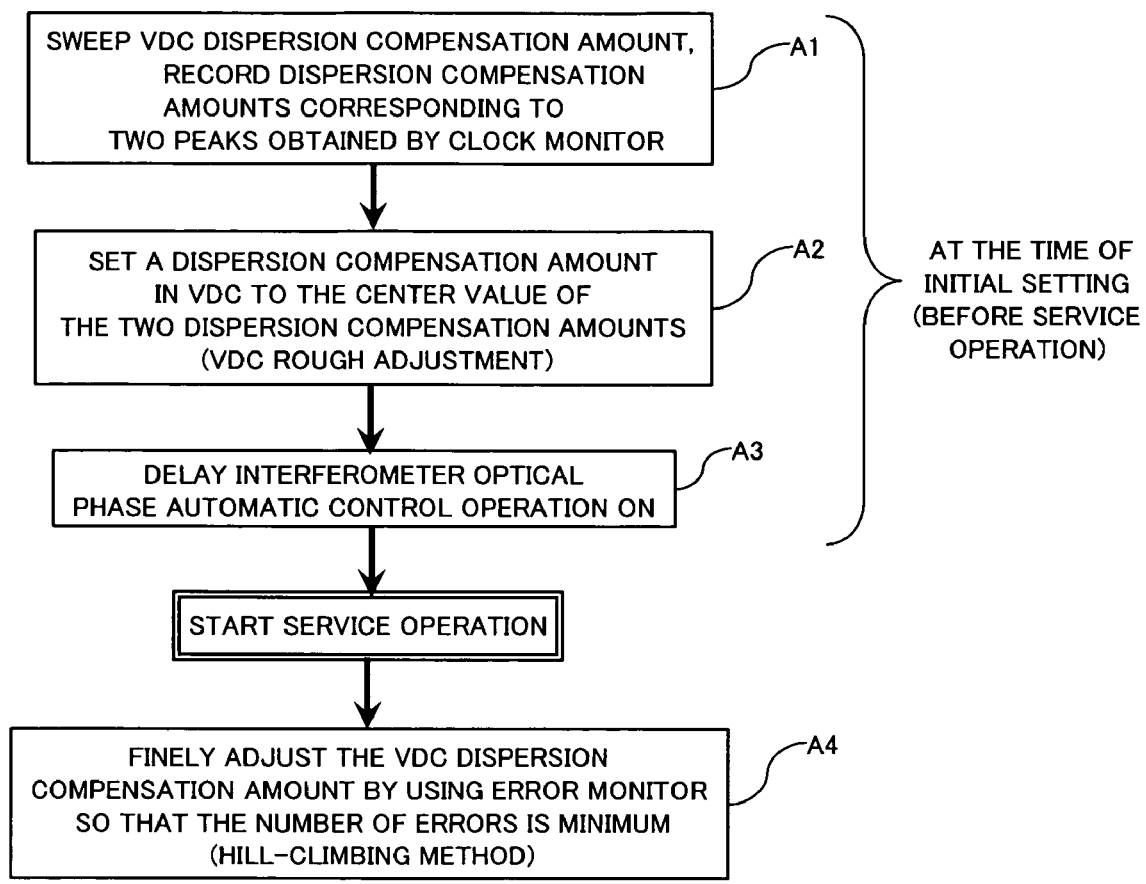
FIG. 10 is a flowchart for illustrating the working of the optical receiving apparatus according to the first embodiment.

As shown in a flowchart in FIG. 10, in the stage where the phase control amount in the delay interferometer 121 and the dispersion compensation amount in the VDC 150 are not yet stabilized, particularly, at the time of initial start of the system, for example, the dispersion compensation amount in the VDC 150 is swept to detect two peaks of the clock signal intensity corresponding to the above dispersion amounts of +50 ps/nm and −50 ps/nm, and the detected peaks are recorded (step A1). After that, the dispersion compensation amount is so set in the VDC controlling unit 202 that the intensity of the clock signal is of the center value of the two peaks (step A2), whereby the dispersion amount can be set to the optimum value of 0 radian.

After the dispersion compensation amount in the VDC 150 is roughly adjusted as above, the feedback control on the phase control amount in the above delay interferometer 121 is started (step A3), and the service operation (that is, system operation) by the optical receiving apparatus 200 can be started. During the system operation, it is necessary to follow changes in dispersion amount due to fluctuations in temperature and the like.

For this, it is possible to control the dispersion compensation amount in the VDC 150 so that the number of errors (or the number of error corrections) detected by the error monitoring function of the received data processing unit 124 is minimum during the system operation as done in a VDC controlling unit 202' in an optical receiving apparatus 200' shown in FIG. 19(A), for example (step A4).

Next, description will be made of the delay interference controlling unit 301 and the VCD controlling unit 302 in the optical receiving apparatus 300 shown in FIG. 1(B).

The delay interference controlling unit 301 in the optical receiving apparatus 300 monitors the phases of optical signals to be interfered with components delayed by one bit time in the delay interferometers 141-1 and 141-2 from at least either demodulated electric signals outputted from the photoelectric converting units 142-1 and 142-2 or output signals from the regenerating circuits 143-1 and 143-2, and controls so that the phases of the optical signals are stabilized at $\pi/4$ radian and $-\pi/4$ radian, respectively.

Figure 11:
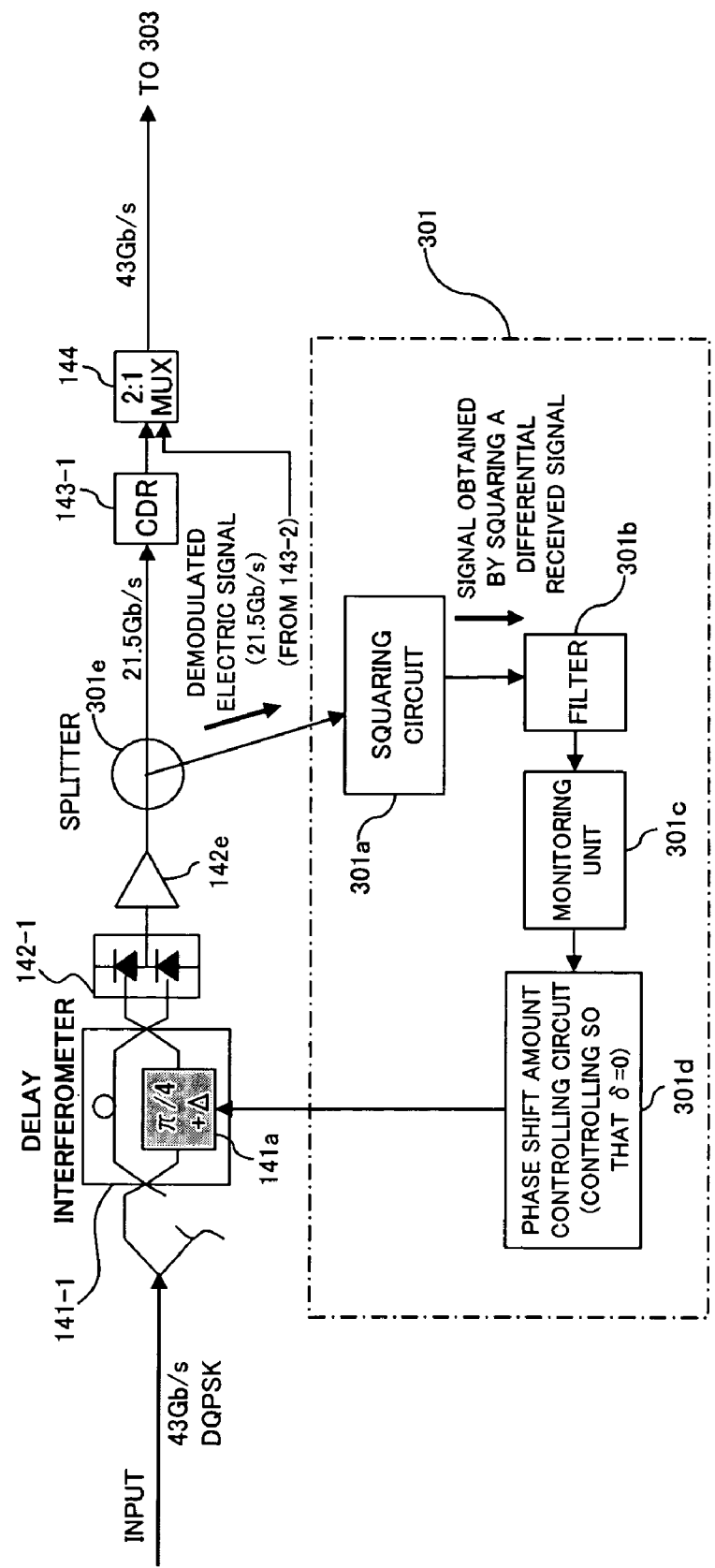
FIG. 11 is a block diagram showing an essential part of the optical receiving apparatus according to the first embodiment.

The delay interference controlling unit 301 of the optical receiving apparatus 300 shown in FIG. 1(B) comprises, as shown in FIG. 11, for example, a squaring circuit 301a, a filtering unit 301b, a monitoring unit 301c and a phase shift amount controlling circuit 301d in order to control the phases in the delay interferometers 141-1 and 141-2. The structures for the phase control in the delay interferometers 141-1 and 141-2 are basically the same, thus the structure for the phase control in the delay interferometer 141-1 is focused in the following description.

The squaring circuit 301a is inputted a part of the demodulated electric signal outputted from the photoelectric converting unit 142-1 through a splitter 301e, and squares the demodulated electric signal. The filtering unit 301b is a filter which allows at least a part of continuous frequency components excepting frequencies which are integral multiples of the symbol frequency, that is, frequencies lower than the symbol frequency (here, 21.5 GHz), of the squared signal from the squaring circuit 301a.

The monitoring unit 301c monitors the power of an output signal from the filtering unit 301b. The phase shift amount controlling unit 301d controls an applied voltage for phase control to an electrode 141a of the delay interferometer 141-1 according to a result of the monitoring from the monitoring unit 301c to shift the phase of an optical signal to be interfered with the component delayed by one bit time by only $\pi/4$ radian.

Figure 12A:
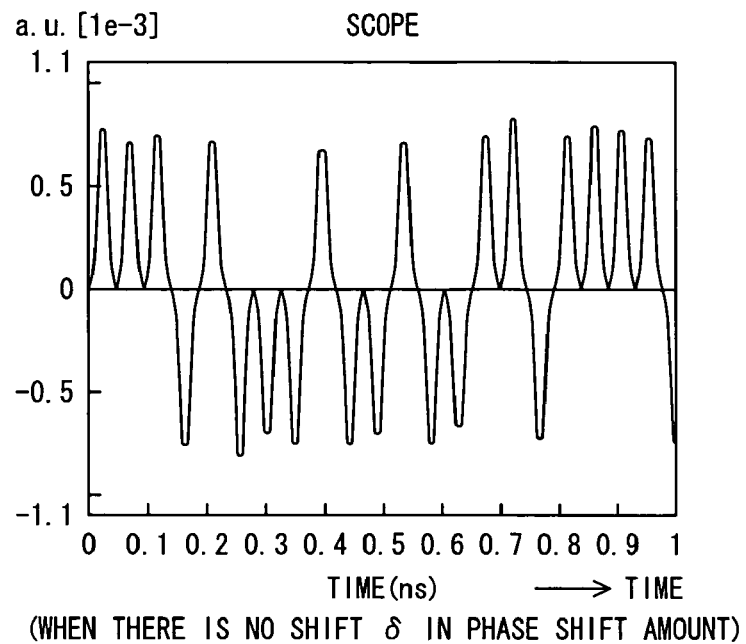
FIGS. 12(A) and 12(B), 13(A) and 13(B), 14(A) and 14(B), 15(A) and 15(B), 16(A) and 16(B), 17(A) and 17(B), and 18 are diagrams for illustrating working of the essential part of the optical receiving apparatus according to the first embodiment.
Figure 12B:
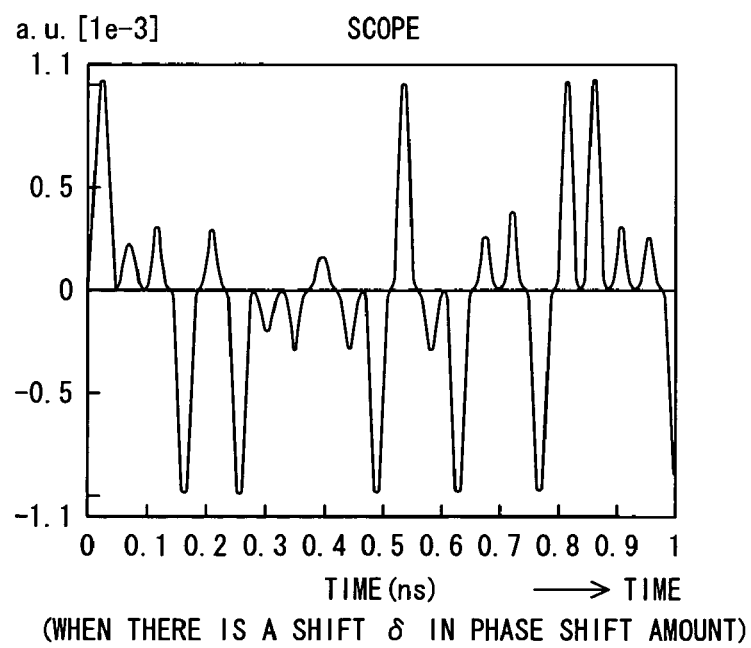
Figure 13A:
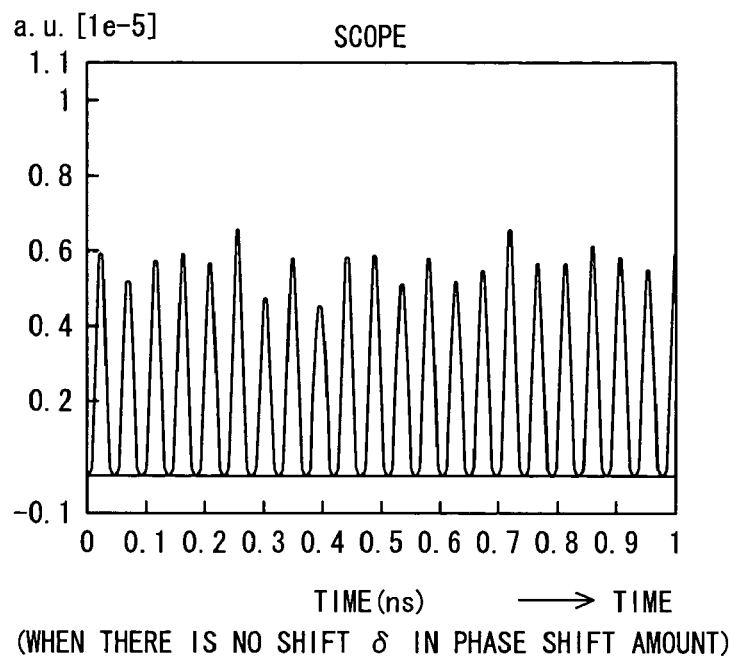
Figure 13B:
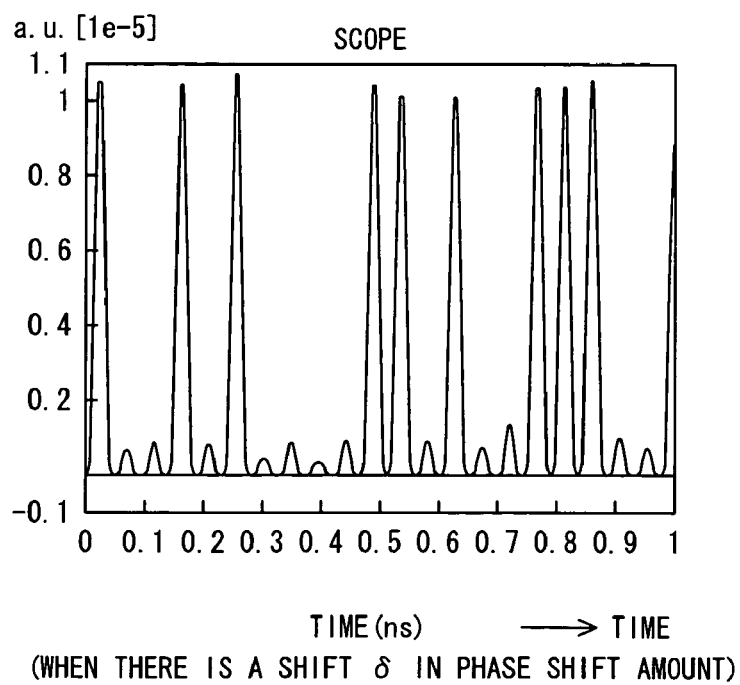
Figure 14A:
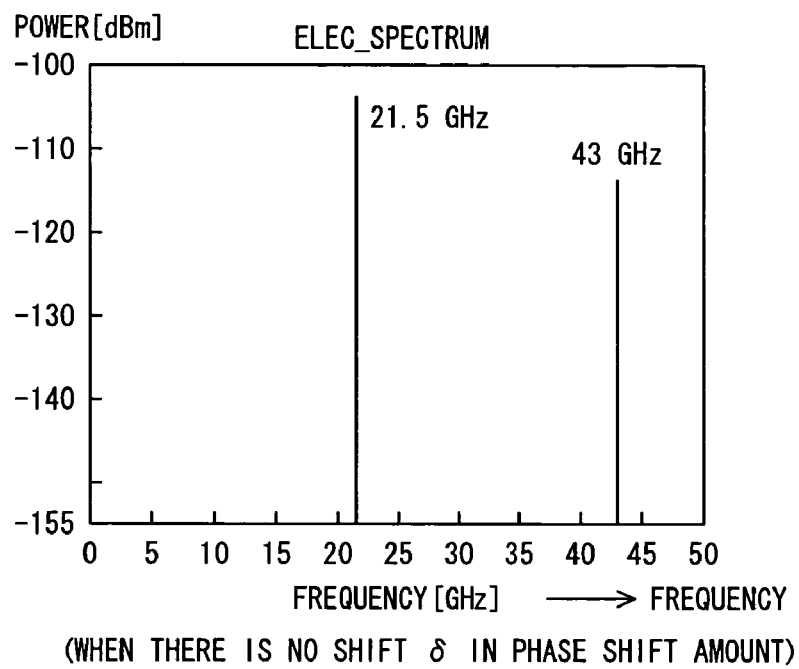
Figure 14B:
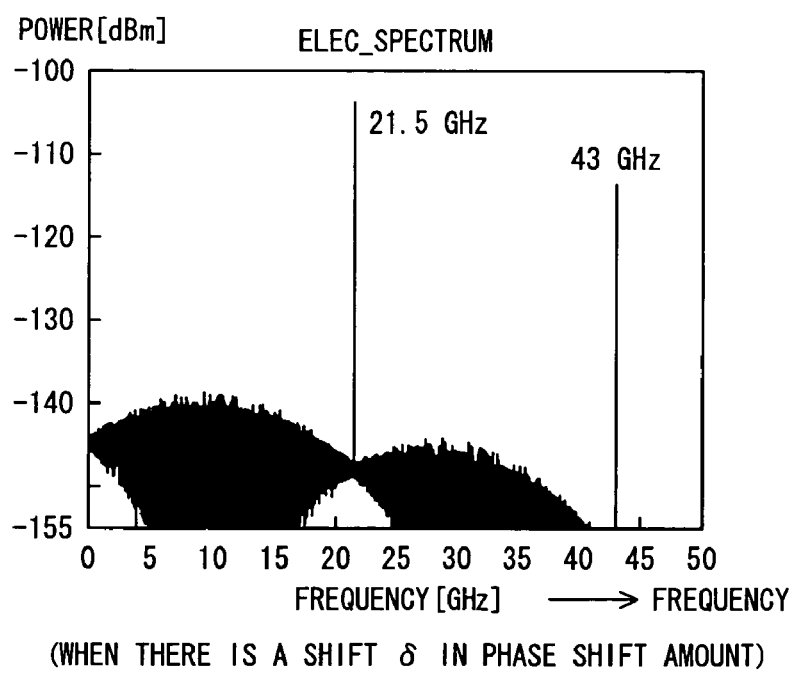

FIGS. 12(A) and 12(B) are diagrams showing waveforms of a demodulated signal outputted from the photoelectric converting unit 141-1. FIGS. 13(A) and 13(B) are diagrams showing waveforms of a squared signal outputted from the squaring circuit 301a. FIGS. 14(A) and 14(B) are diagrams showing spectra of the squared signal.

When the phase control amount is appropriately controlled (at $\pi/4$ radian), the waveform of the demodulated electric signal is stable, and the squared signal is in a waveform where almost constant values appear in the symbol cycle, as shown in FIGS. 12(A) and 13(A). In which case, only the symbol frequency component (here, 21.5 GHz) and its high frequency component appear in the spectrum of the squared signal, as shown in FIG. 14(A).

When the phase shift amount is "$\pi/4+\Delta$ ($\Delta=30$ degree)" shifted from "$\pi/4$ radian," for example, the waveform of the demodulated signal is unstable, and various values of its squared value appear at random, as shown in FIGS. 12(B) and 13(B). In this case, the spectrum of the squared signal involves various frequency components, as shown in FIG. 14(B).

Namely, when the shift in the phase shift amount ($\Delta$ in the case where the phase shift amount is $\pi/4+\Delta$) is zero, the squared signal involves only the symbol frequency component and its high frequency component. In which case, the power detected by the monitoring unit 301c is close to zero. When the shift in the phase shift amount occurs, the squared signal involves relatively how frequencies. In which case, the power detected by the monitoring unit 301c is of a value corresponding to an amount of the shift. Accordingly, the phase shift amount controlling circuit 301d feedback-controls the applied voltage to the electrode 141a to minimize the power detected by the monitoring unit 301c, whereby the phase shift amount is converged to "$\pi/4$ radian."

Since the dispersion compensation controlling unit 302 controls the dispersion compensation amount in the VDC 150 on the basis of a clock signal extracted by either one of the regenerating circuits 143-1 and 143-2 (the regenerating circuit 143-2 in this case), it is possible to control the dispersion compensation amount to the optimum point without referring to the number of errors, as follows.

Figure 15A:
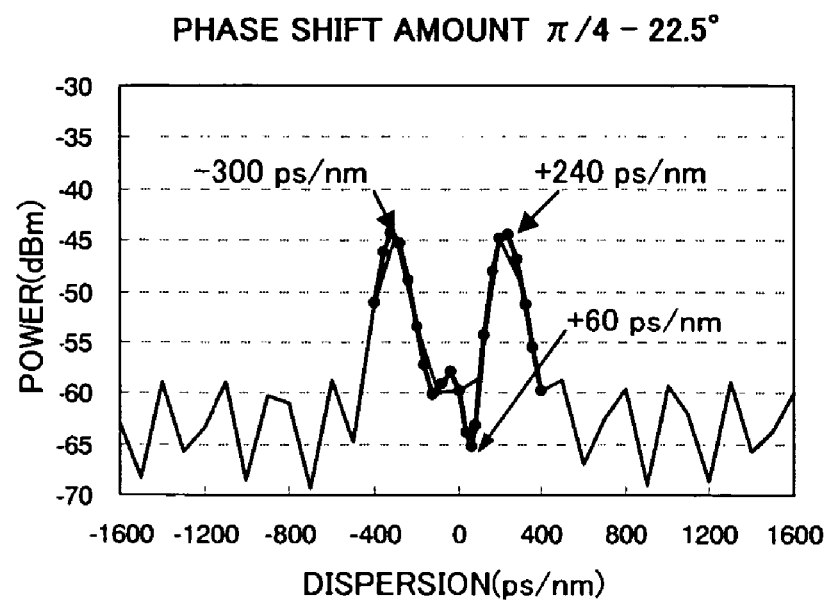
Figure 16A:
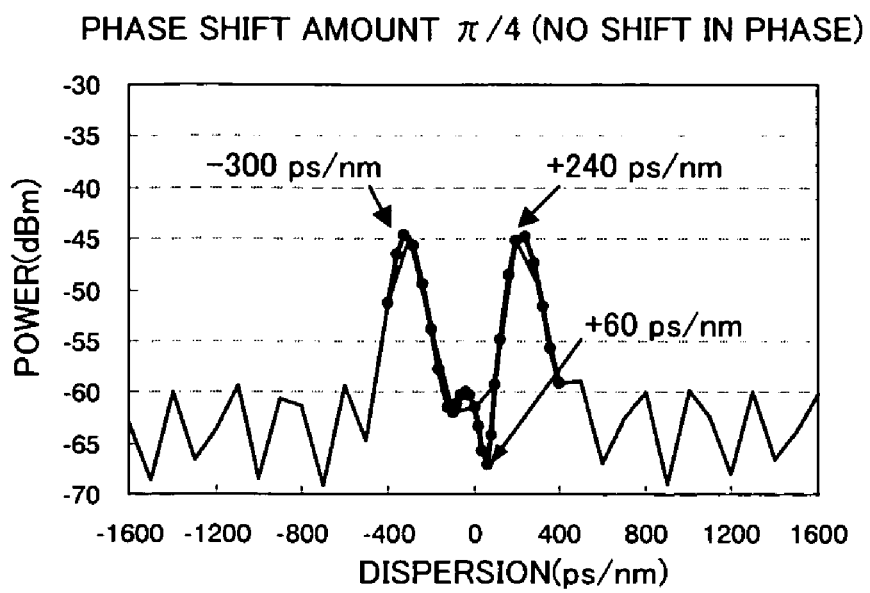
Figure 17A:
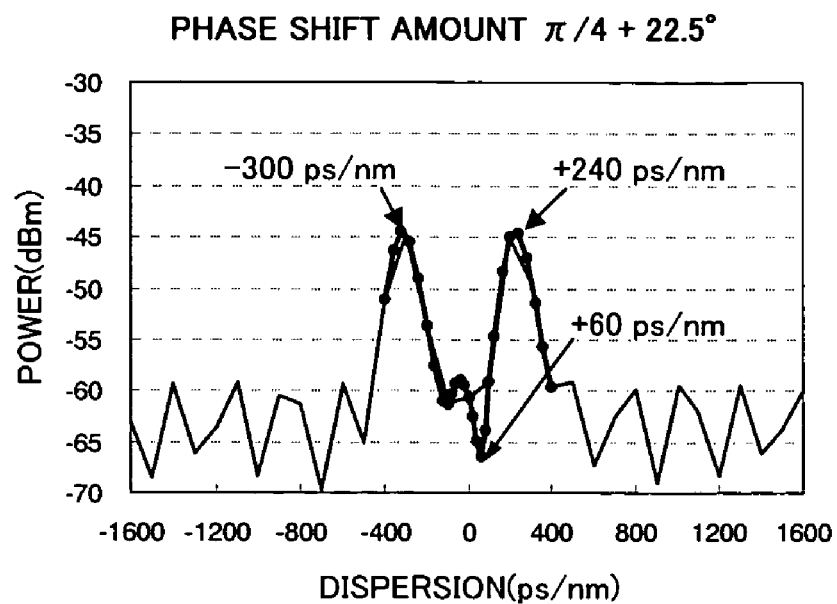

FIGS. 15(A), 16(A) and 17(A) are diagrams showing results of simulation of the clock signal intensity obtained when the dispersion amount in the transmission path 101 is changed. FIG. 15(A) shows a case where the phase shift in the delay interferometers 141-1 and 141-2 is −22.5 degree. FIG. 16(A) shows a case where the phase shift in the delay interferometers 141-1 and 141-2 is 0 degree, that is, there is no phase shift. FIG. 17(A) shows a case where the phase shift in the delay interferometers 141-1 and 141-2 is 22.5 degree.

Figure 15B:
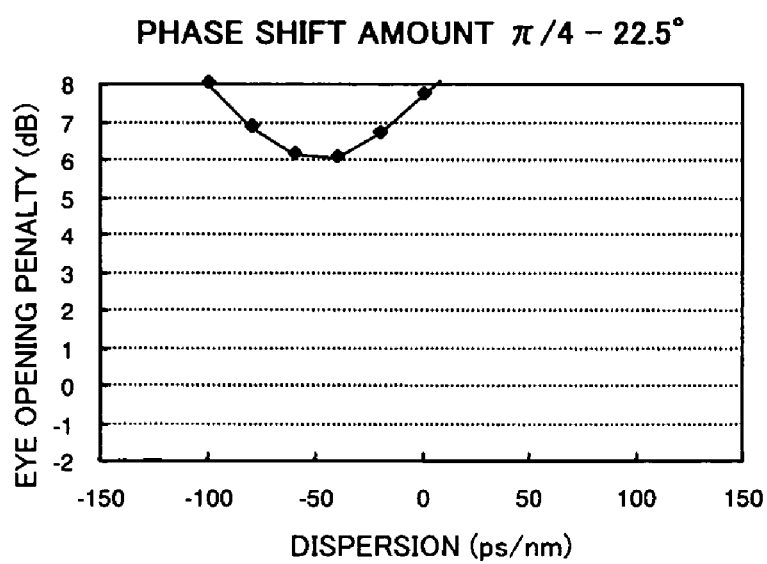
Figure 16B:
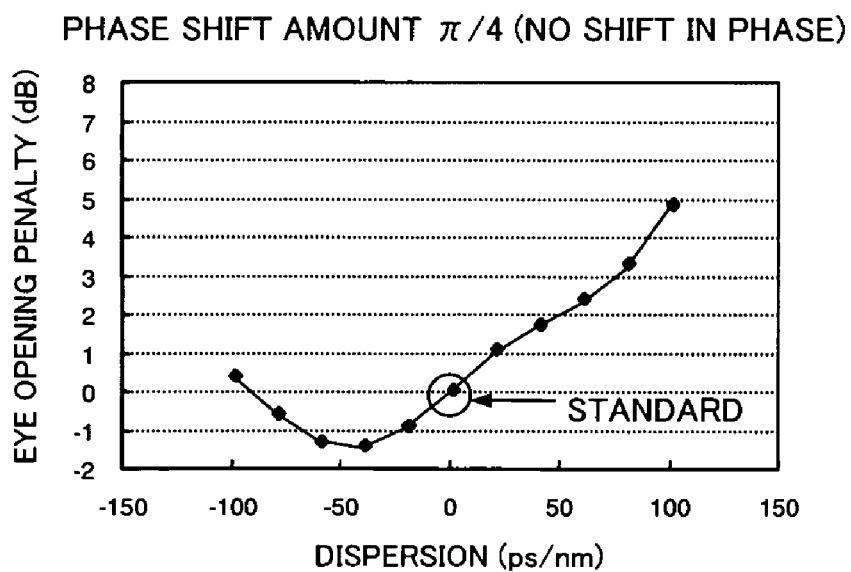
Figure 17B:
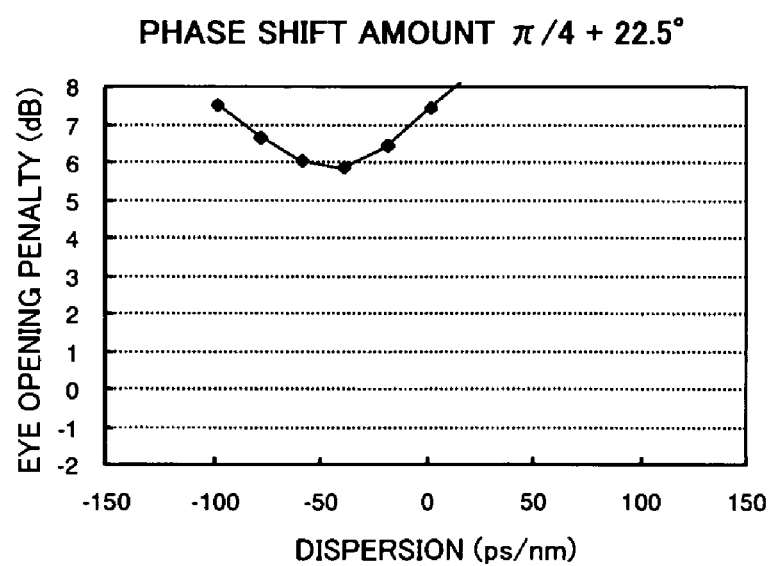

FIGS. 15(B), 16(B) and 17(B) are diagrams showing results of simulation of the eye opening penalty representing the optical signal quality obtained when the dispersion amount in the transmission path 101 is changed. FIG. 15(B)

shows a case where the phase shift in the delay interferometers 141-1 and 141-2 is −22.5 degree. FIG. 16(B) shows a case where the phase shift in the interferometers 141-1 and 141-2 is 0 degree, that is, there is no phase shift. FIG. 17(B) shows a case where the phase shift in the delay interferometers 141-1 and 141-2 is 22.5 degree.

Figure 18:
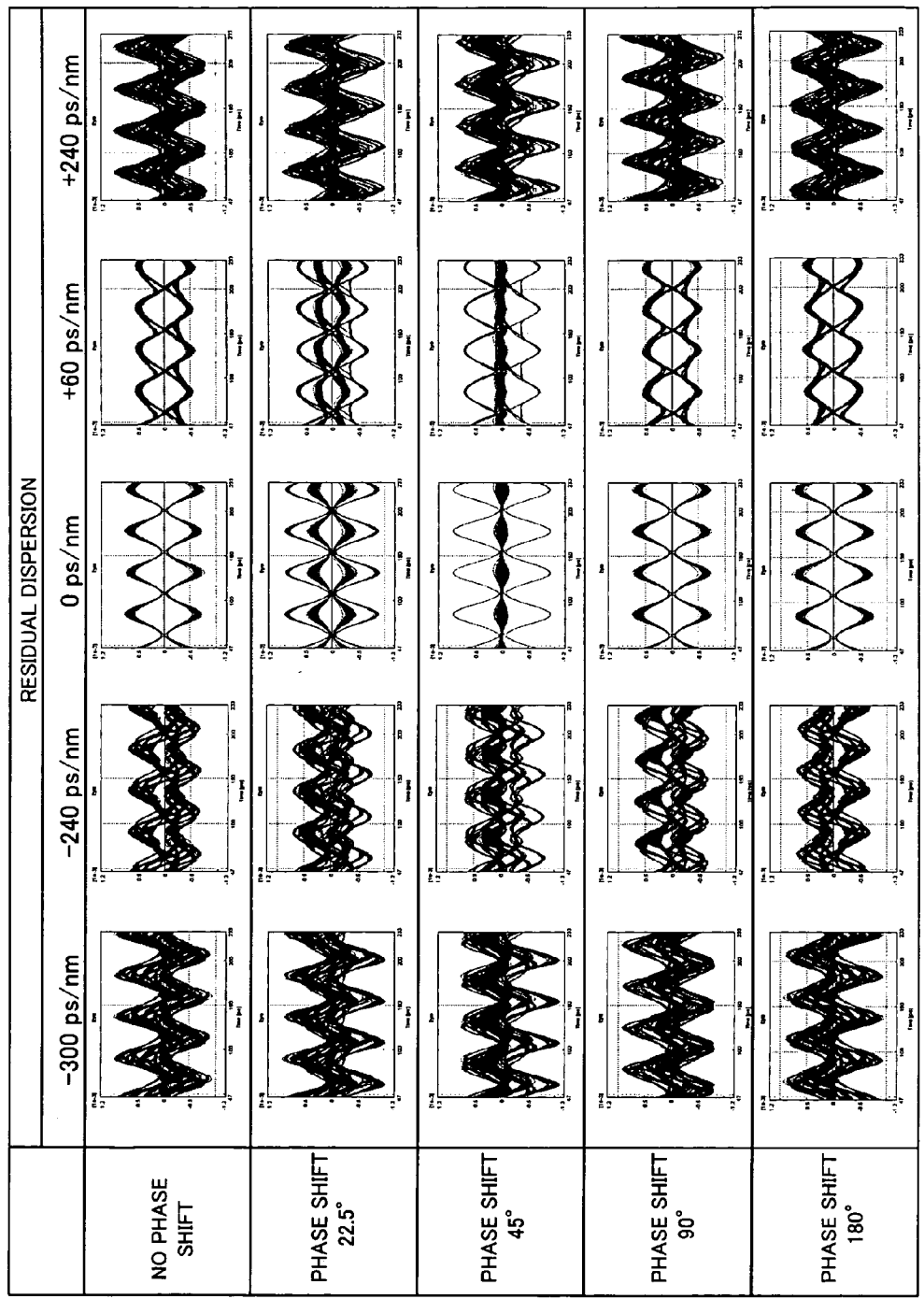

FIG. 18 shows eye patterns of demodulated electric signals inputted to the regenerating circuits 143-1 and 143-2 obtained when the phase shift amount in the delay interferometers 141-1 and 141-2 is at 0, 22.5, 45, 90 and 180 degrees correspondingly to the residual dispersion amounts. As shown in FIG. 18, it is found that the signal quality is the best when the residual dispersion is 0 ps/nm and there is no phase shift in the delay interferometers 141-1 and 141-2. It is also found that the amplitude of the clock component changing from the low level to the high level to the low level within one bit is in almost the same pattern irrespective of the phase shift in the delay interference system, and changes according to only the dispersion compensation amount.

As shown in FIGS. 15(B), 16(B) and 17(B), the optical signal quality changes according to the magnitude of the phase control amount shift in the delay interferometers 141-1 and 141-2. However, the clock signal intensity extracted by the regenerating circuit 143-2 has a characteristic not dependent on the magnitude of the phase control amount shift in the delay interferometer 141-2, and has stable peaks at +240 ps/nm and −300 ps/nm of the dispersion amount.

Like the above-mentioned optical receiving apparatus 200 shown in FIG. 1(A), it is possible to set the dispersion compensation amount to the optimum value by setting the clock signal intensity to the center of the two peaks along the axis of the dispersion amount. In this simulation, since the RZ pulse-curving intensity modulator (refer to a reference number 136 in FIG. 31) on the transmitter's side adds positive chirping, the minimum penalty and the dispersion monitored peak values are shifted toward the negative side. However, the dispersion amount is optimally compensated at a clock intensity situated in the center of the two peaks, like the case shown in FIG. 1(A).

As shown in the flowchart in FIG. 10, in a stage where the phase control amount in the delay interferometers 141-1 and 141-2 and the dispersion compensation amount in the VDC 150 are not stabilized, particularly, at the time of the initial start of the system or the like, the dispersion compensation amount in the VDC 150 is first swept, and two peaks of the clock signal intensity corresponding to the above +240 ps/nm and −300 ps/nm of the dispersion amount are detected and recorded (step A1). The VDC controlling unit 302 then sets the dispersion compensation amount so that the clock signal intensity is situated at the center value of the two peaks (step A2), whereby the dispersion amount can be set to the optimum value.

After the dispersion compensation amount in the VDC 150 is roughly adjusted as above, the feedback control on the phase control amount in the delay interferometers 141-1 and 141-2 is started (step A3), and the service operation (that is, the system operation) by the optical receiving apparatus 300 can be started. During the system operation, it is necessary to follow changes in dispersion amount due to fluctuations in temperature or the like.

For this, like the VDC controlling unit 302' in the optical receiving apparatus 300' shown in FIG. 19(B), for example, the dispersion compensation amount in the VDC 150 may be controlled so that the number of errors detected by the error monitoring function of the received data processing unit 145 is the minimum, during the operation of the system (step A4).

The optical receiving apparatus 200 or 300 structured as above can quickly stabilize the control amount even in a state where the phase control amount in the delay interferometers 121, or 141-1 and 141-2 and the dispersion compensation amount in the VDC 150 are not stabilized at the time of a start of the operation of the system or the initial setting of the apparatus such as the protection processing, path switching or the like.

In other words, the VDC 150 is controlled on the basis of the clock signal by the VDC controlling unit 202 or 302, the delay interference process is controlled by the delay interference controlling unit 201 or 301 after that control on the VDC 150 is started, whereby the optimum dispersion control amount can be searched even in a state where the phase control amount in the delay interferometer 121, or 141-1 and 141-2 is not stabilized, and the dispersion compensation amount is quickly stabilized. After the dispersion compensation amount is quickly stabilized, the phase control amount in the delay interferometer 121, or 141-1 and 141-2 is feedback-controlled, whereby the phase control amount can be stabilized more quickly than the case where the phase control amount is controlled in a state where the dispersion compensation amount is not stabilized.

As above, the first embodiment of this invention provides an advantage that the VDC 150 in the optical receiving apparatus 200 or 300 can be set, efficiently and optimally, in the initial setting (at the time of a start of the system operation, protection or path switching) by means of the VDC controlling unit 202 or 302. When the delay interference controlling unit 201 or 301 for controlling the phase control amount in the delay interferometer 121, or 141-1 and 141-2 is provided, it is possible to quickly stabilize the control by the delay interference controlling unit 201 or 301 and the VDC controlling unit 202 or 302.

The clock signal or the number of errors, which are elements to be fed back to the VDC controlling unit 202 or 302, can be captured from a device already integrated in the optical receiving apparatus such as the regenerating circuit 123, or 143-1 and 143-2, the received data processing unit 124 or 145 and the like through interfaces. This allows a low-cost, small-sized apparatus.

FIG. 20(A) is a block diagram showing an optical receiving apparatus 200A adopting (CS)RZ-DPSK modulation/demodulation system, as an example to be compared with the above-mentioned optical receiving apparatus 200 according the first embodiment. FIG. 20(B) is a block diagram showing an optical receiving apparatus 300A adopting (CS)RZ-DQPSK modulation/demodulation system, as an example to be compared with the optical receiving apparatus 300. Unlike the above optical receiving apparatuses 200 and 300 according to the first embodiment, the optical receiving apparatuses 200A and 300A have exclusive clock monitors 205 and 305 for capturing clock signals used when the VDC control is performed by the VDC controlling units 202A and 302A, respectively. Incidentally, the structure similar to that of the clock monitors 205 and 305 is described in the above patent document 1.

The clock monitor 205 in the optical receiving apparatus 200A comprises a photoelectric converter 205a which takes out a portion of a signal outputted from the VDC 150 in the upper stream of the delay interference processing by the delay interferometer 121 and performs photoelectric conversion on the branched portion of the optical signal, a band pass filter (BPF) 205b which allows a frequency component (BHz) corresponding to the bit rate of the optical signal from the photoelectric converter 205a to pass therethrough and outputs the clock signal frequency component, and a power sensor 205c which detects the power of the clock signal frequency component having passed through the band pass filter 205b.

Similarly, the clock monitor 305 in the optical receiving apparatus 300A comprises a photoelectric converter 305a similar to that of the clock monitor 205, a band pass filter (BPF) 305b which allows a half (B/2 Hz) of a frequency component corresponding to the bit rate (B bit/s) of an optical signal from the photoelectric converter 305a to pass therethrough and outputs a clock signal frequency component, and a power sensor 305c which detects the power of the clock signal frequency component having passed through the band pass filter 305.

Figure 21:
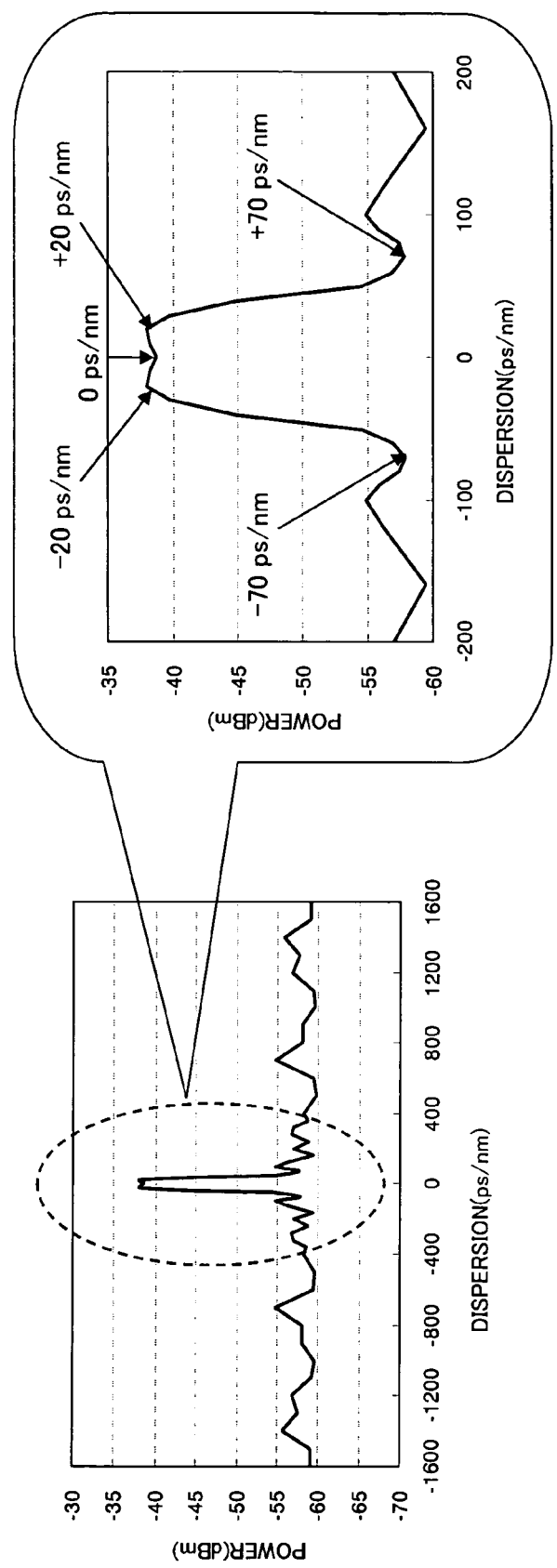
FIG. 21 is a diagram for illustrating working of an essential part of the optical receiving apparatus shown in FIG. 20(A)
Figure 22:
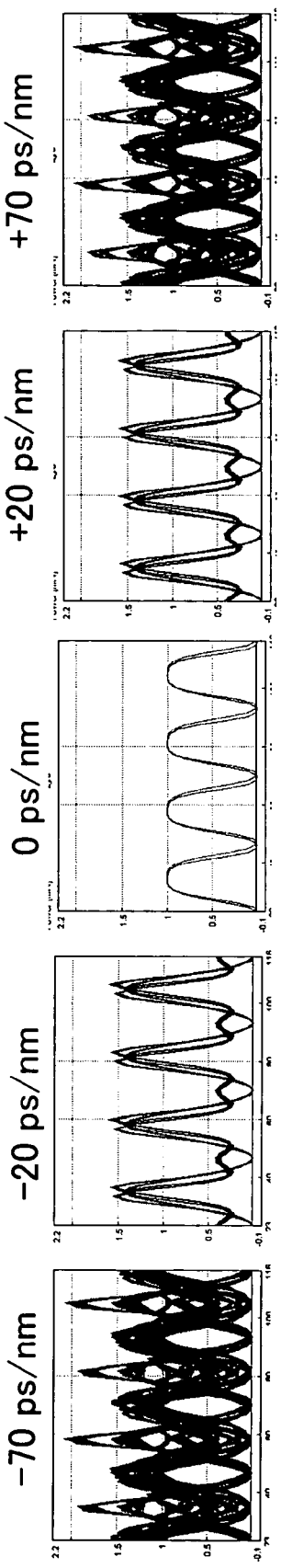
FIG. 22 is a diagram for illustrating the working of the essential part of the optical receiving apparatus shown in FIG. 20(A)

FIG. 21 is a diagram showing a result of simulation about a relationship between a power value of the clock signal monitored by the clock monitor 205 in the optical receiving apparatus 200A and a swept dispersion amount when the dispersion amount is swept. FIG. 22 is a diagram showing optical signal waveforms according to dispersion amounts (−70 ps/nm, −20 ps/nm, 0 ps/nm, 20 ps/nm and 70 ps/nm) remaining in the optical signal having passed through the VDC 150.

In this case, when the dispersion amount is 0 ps/nm, the waveform is most stable, as shown in FIG. 22, and stable peaks are obtained at +20 ps/nm and −20 ps/nm of the dispersion amount, as shown in FIG. 21. Like the optical receiving apparatus 200, it is possible to set the dispersion compensation amount to the optimum value of 0 radian by setting the clock signal intensity to the center of the two peaks along the axis of the dispersion amount.

Figure 23:
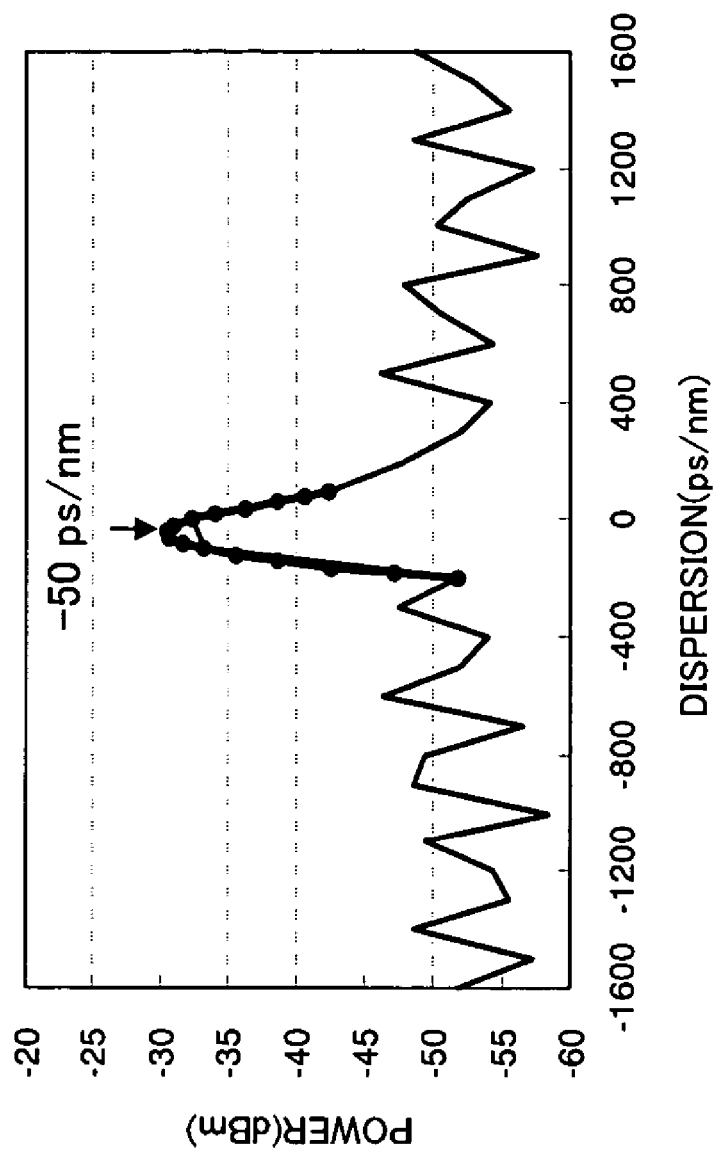
FIGS. 23 and 24 are diagrams for illustrating working of an essential part of the optical receiving apparatus shown in FIG. 20(B)
Figure 24:
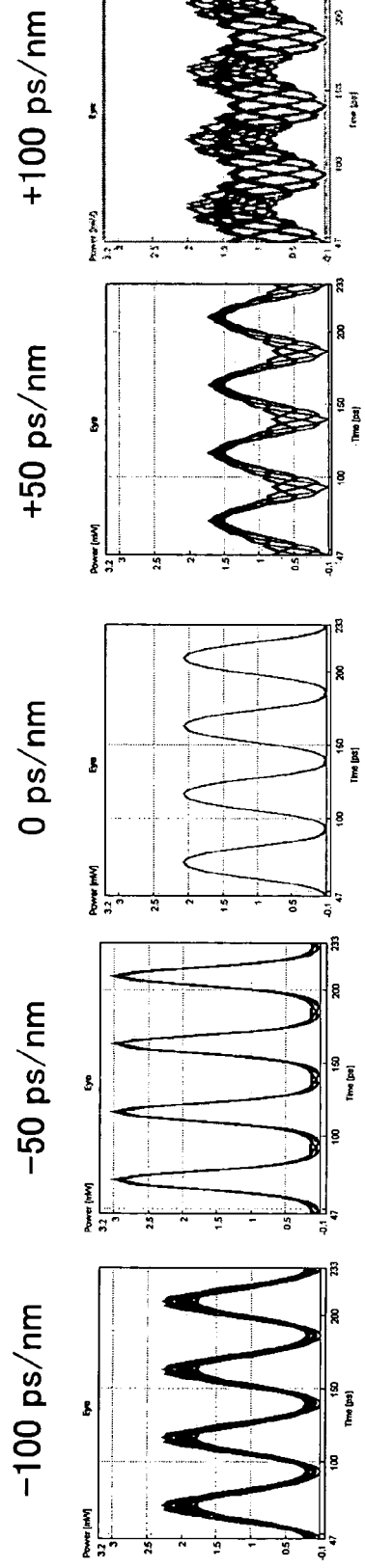

FIG. 23 is a diagram showing a result of simulation about a relationship between a power value of the clock signal monitored by the clock monitor 305 in the optical receiving apparatus 300A and a swept dispersion amount obtained when the dispersion amount is swept. FIG. 24 is a diagram showing optical signal waveforms according to dispersion amounts (−100 ps/nm, −50 ps/nm, 0 ps/nm, 50 ps/nm and 100 ps/nm) remaining in the optical signal having passed through the VDC 150.

In this case, the waveform is most table at 0 ps/nm of the dispersion amount, as shown in FIG. 24. A stable peak is obtained at 0 ps/nm of the dispersion amount, as shown in FIG. 24. Accordingly, it is possible to set the dispersion compensation amount to the optimum value of 0 radian by setting the clock signal intensity to the center of the peak along the axis of the dispersion amount.

Unlike the first embodiment described above, the optical receiving apparatuses 200A and 300A shown in FIGS. 20(A) and 20(B) require the exclusive clock monitors 205 and 205, respectively. Basically, like the first embodiment described above, it is advantageously possible to set, efficiently and optimally, the VDCs 150 in the optical receiving apparatuses 202 and 302 at the time of the initial setting (at the time of a start of the system operation, protection and path switching) and during the system operation.

Figure 25:
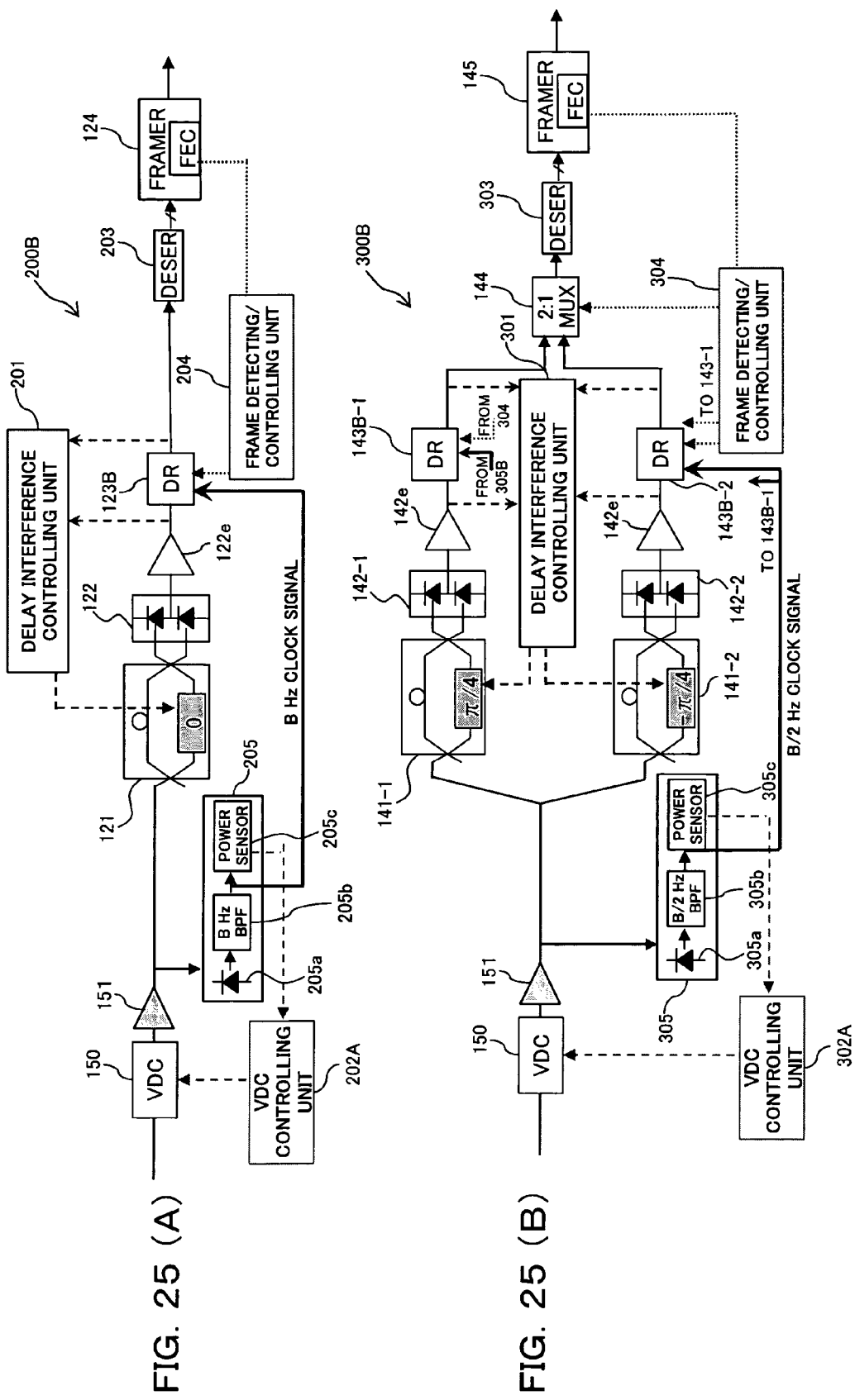
FIGS. 25(A) and 25(B) are block diagrams showing modifications of the optical receiving apparatuses shown in FIGS. 20(A) and 20(B)

As a modification of the optical receiving apparatuses 200A and 300A shown in FIGS. 20(A) and 20(B), the clock signal (an output of the band pass filter 205b or 305b) generated by the optical clock monitor 205 or 305 may be used for data regeneration processing in a signal discriminating unit (DR: Data Recovery) 123B, or 143B-1 and 143B-2 having a data regenerating function involved in the regenerating circuit 123, or 143-1 and 143-2 as done in optical receiving apparatuses 200B or 300B shown in FIG. 25(A) or 25(B).

[B] Description of Second Embodiment

Figure 26:
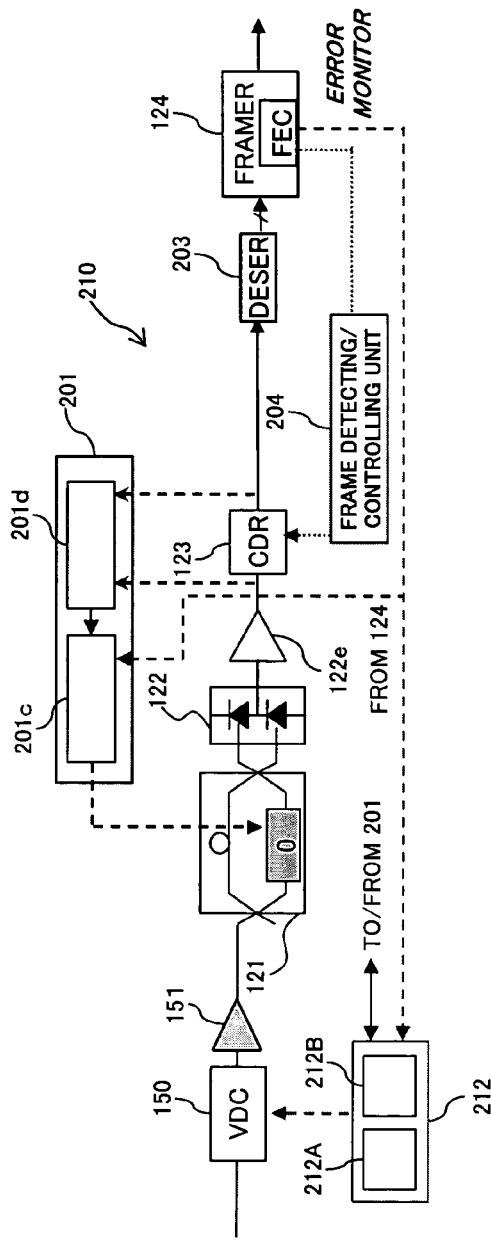
FIGS. 26(A) and 26(B) are block diagrams showing optical receiving apparatuses according to a second embodiment of this invention.
Figure 26:
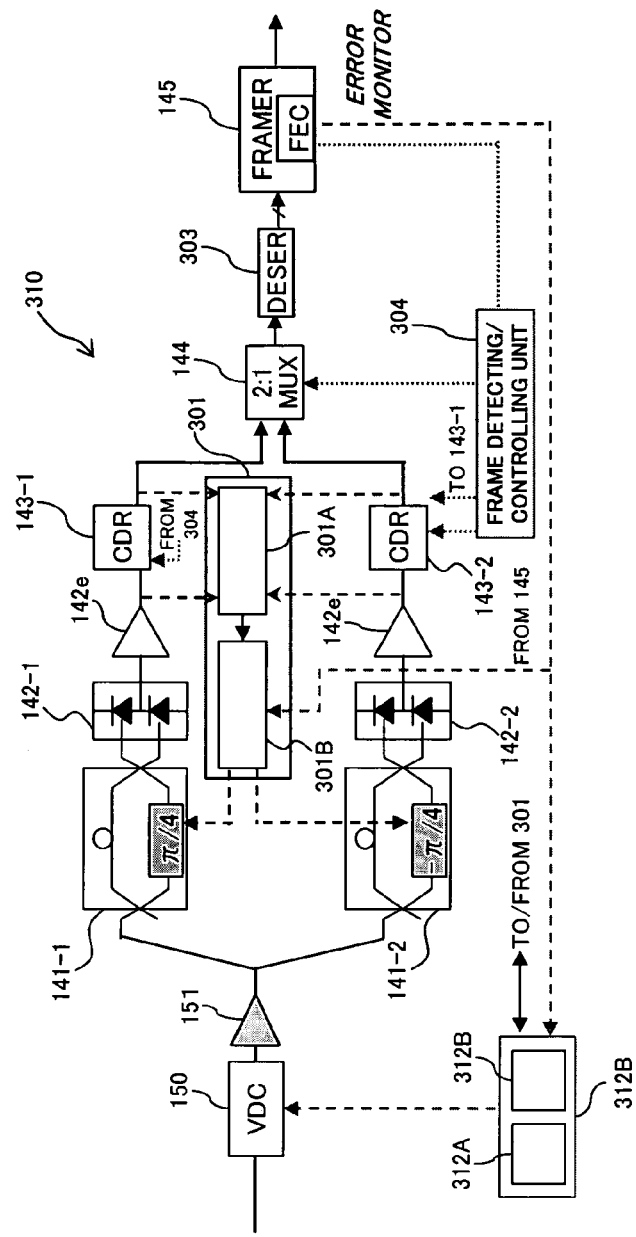

FIGS. 26(A) and 26(B) are block diagrams showing optical receiving apparatuses 210 and 310 according to a second embodiment of this invention. The optical receiving apparatus 210 shown in FIG. 26(A) adopts (CS)RZ-DPSK modulation/demodulation system, which is differential binary phase modulation. The optical receiving apparatus 210 is characterized by a control sequence for setting the dispersion compensation amount in a VDC 150, and a control sequence for setting the phase control amount in a delay interferometer 121.

The optical receiving apparatus 310 shown in FIG. 26(B) adopts (CS)RZ-DQPSK modulation/demodulation system, which is differential quaternary phase modulation. The optical receiving apparatus 310 is characterized by a control sequence for setting the dispersion compensation amount in a VDC 150 and a control sequence for setting the phase control amount in delay interferometers 141-1 and 141-2. Incidentally, like reference characters in FIGS. 26(A) and 26(B) designate like or corresponding parts in FIGS. 1(A) and 1(B).

The delay interference controlling unit 201 in the optical receiving apparatus 210 shown in FIG. 26(A) comprises an optical phase difference detecting circuit 201d for detecting an optical phase difference of an optical signal to be interfered with a component delayed by one bit time in the delay interferometer 121, and a delay amount controlling circuit 201c for giving a phase control amount in the delay interferometer 121. The delay amount controlling circuit 201c according to the second embodiment gives the phase control amount in the delay interferometer 121, on the basis of the number of error at the time of the initial setting, and on the basis of the optical phase difference detected by the optical phase difference detecting circuit 201d after the initial setting.

In order to detect the above optical phase difference on the basis of a demodulated signal from a photoelectric converting unit 122, the optical phase difference detecting circuit 201d may comprise the squaring circuit 201a and the monitor 201b shown in FIG. 2 described above. Further, the optical phase difference detecting circuit 201d may detect the optical phase difference on the basis of a data signal from a regenerating circuit 123.

The delay interference controlling unit 301 in the optical receiving apparatus 310 shown in FIG. 26(B) comprises an optical phase difference detecting circuit 301A for detecting phase differences Δ from π/4 and −π/4 of optical phases of optical signals to be interfered with components delayed by one bit time in the respective delay interferometers 141-1 and 141-2, and a delay amount controlling circuit 301B for giving phase control amounts in the respective delay interferometers 141-1 and 141-2. The delay amount controlling circuit 301B gives phase control amounts in the respective delay interferometers 141-1 and 141-2, on the basis of the number of errors at the time of the initial setting, and on the basis of the optical phase differences detected by the optical phase detecting circuit 301A after the initial setting.

In order to detect the above optical phase differences on the basis of demodulated signals from the photoelectric converting units 141-1 and 141-2, the optical phase difference detecting circuit 301A may comprise the squaring circuit 301a, the filter 301b and the monitor 301c shown in FIG. 11 described above. Further, the optical phase difference detecting circuit 301A may detect the optical phase differences on the basis of data signals from regenerating circuits 143-1 and 143-2, respectively.

Unlike the VDC controlling units 202 and 302 according to the first embodiment described above, VDC controlling units 212 and 312 in the optical receiving apparatuses 210 and 310 shown in FIGS. 26(A) and 26(B) set and control the dispersion compensation amounts according to the numbers of errors obtained by error monitors in received data processing units 124 and 145, respectively, from the time of initial setting of the apparatus.

Figure 27:
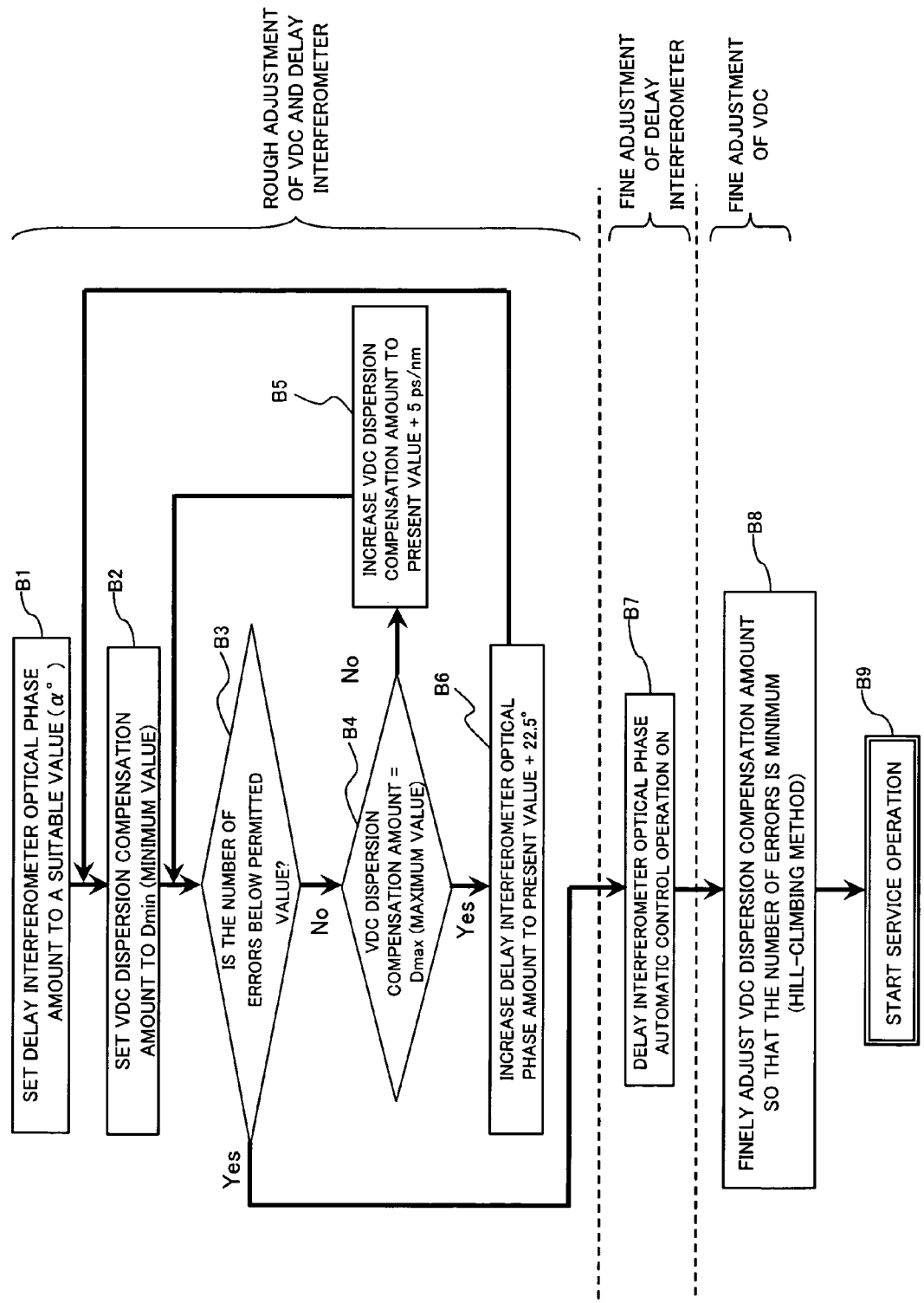
FIG. 27 is a flowchart for illustrating working of the optical receiving apparatus according to the second embodiment.
Figure 28:
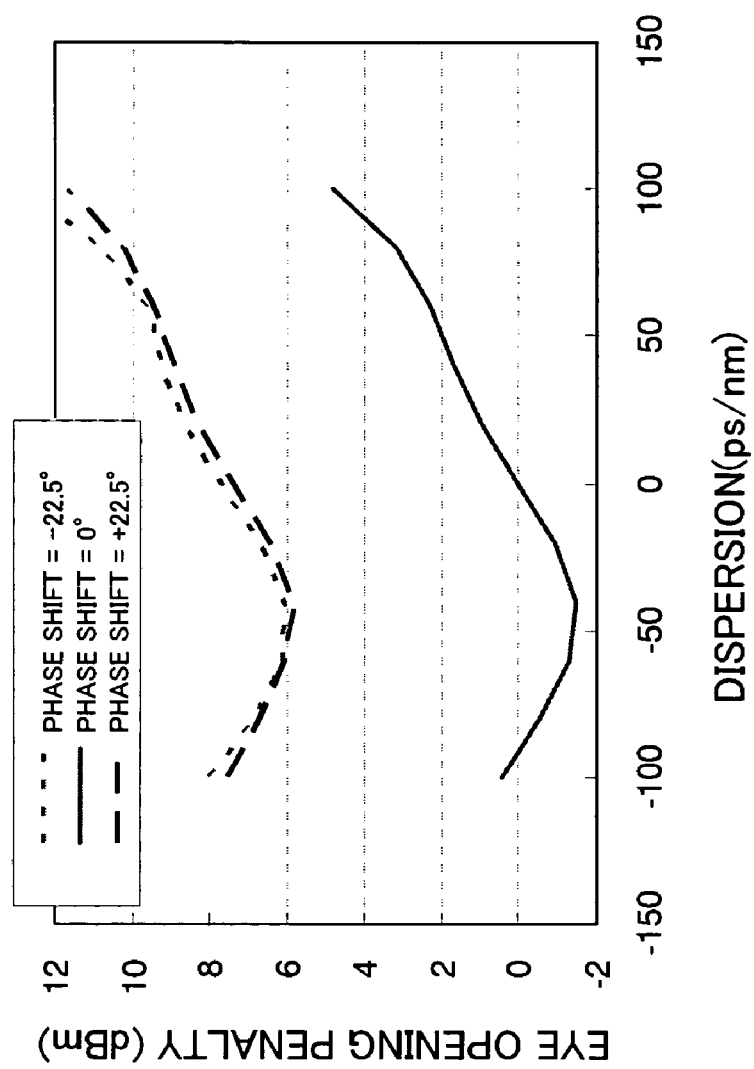
FIGS. 28 and 29 are diagrams for illustrating a relationship between a shift in phase control amount and a dispersion compensation amount.

Giving attention to the control in the optical receiving apparatus 210, it is found that the variable dispersion compensation amount in the VDC 150 and the phase control amount in the delay interferometer 121 are mutually related, as shown in FIG. 28. When the variable dispersion compensation amount and the phase control amount are optimum, the number of errors is minimum. Accordingly, as shown in a flowchart in FIG. 27, the control is performed in such a manner that the optimum values of the both are roughly searched by collecting combinations of the VDC 150 and the delay interferometer 121, the phase control amount in the delay interferometer 121 is finely adjusted, and the VDC 150 is finely adjusted, whereby the simultaneous control on the both devices can be attained.

Figure 29:
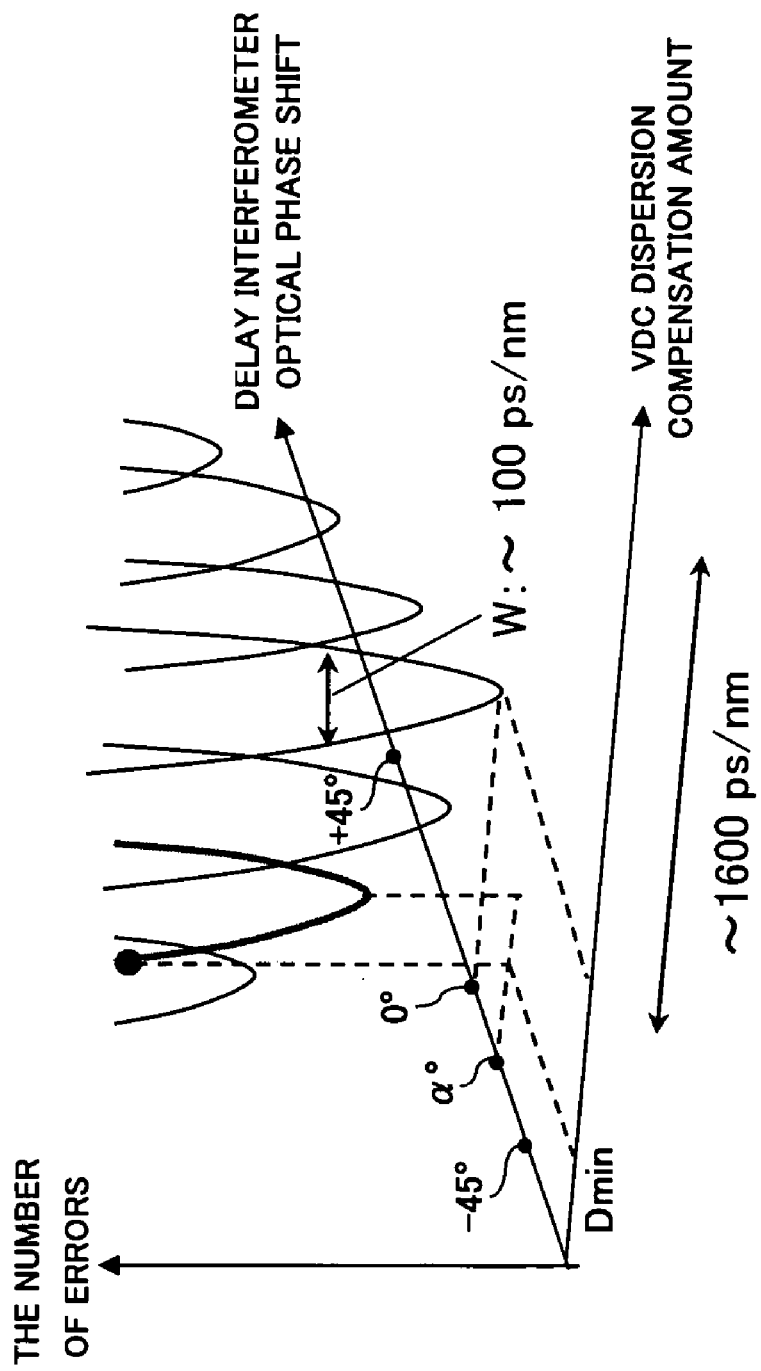

When the VDC 150 and the delay interferometer 121 are roughly adjusted, the delay amount controlling circuit 201c in the delay interference controlling unit 201 sets the phase control amount in the delay interferometer 121 to a suitable value ($\alpha$ degree) as the initial value (step B1, refer to FIG. 29), and the VDC controlling unit 212 sets the dispersion compensation amount in the VDC 150 to the minimum value Dmin that the VDC controlling unit 212 can control (step B2, refer to FIG. 29). The VDC controlling unit 212 captures the number of errors at this time from the received data processing unit 124, and compares the captured number of errors with an allowable value (predetermined value) beforehand set (step B3).

When the number of errors captured from the received data processing unit 124 is larger than the above allowable value (No route at step B3), the dispersion compensation amount in the VDC 150 is controlled to be increased by +5 ps/nm at a time, for example, until the number of errors is below the above allowable value or the dispersion compensation amount in the VDC 150 is the controllable maximum value Dmax (from No route at step B4 to step B5).

As shown in FIG. 29, the width of the dispersion compensation amount below which the number of errors is allowable is about 100 ps/nm. The upper limit of the width (D min to D max) of the dispersion compensation amount in the VDC 150 that the VDC controlling unit 212 can control is about 1600 ps/nm.

When a dispersion compensation amount at which the number of errors from the received data processing unit 124 is below the predetermined value is not obtained in the VDC 150, the optical phase control amount in the delay interferometer 121 is increased from an initial value $\alpha$ by a predetermined amount at a time until the dispersion compensation amount at which the number of errors is blow the predetermined value in the received data processing unit 124 is obtained.

In concrete, if the number of errors is greater than the allowable value even when the dispersion compensation amount in the VDC 150 is the maximum value Dmax that can be controlled, the VDC controlling unit 212 notifies the delay interference controlling unit 201 of it. The delay amount controlling unit 201c in the delay interference controlling unit 201 increases the phase control amount in the delay interferometer 121 from the current value by 22.5 degree (from Yes route at step B4 to step B6). After the delay interference controlling unit 212 increases the phase control amount as this, the VDC controlling unit 212 sets the dispersion compensation amount in the VDC 150 to the minimum value Dmin that the VDC controlling unit 212 can be controlled (step B2 following step B6), and compares the number of errors captured by the received data processing unit 124 with the above allowable value (step B3).

Accordingly, the above VDC controlling unit 212 has a function as a first dispersion compensation controlling unit 212A which controls the VDC 150 to perform rough adjustment so that a dispersion compensation amount in the VDC 150 at which the number of errors from the received data processing unit 124 is below the predetermined value is obtained when the operation of the optical receiving apparatus 210 is started. The delay amount controlling unit 201c in the delay interference controlling unit 201 functions as a first phase controlling unit which roughly adjusts the optical phase control amount in the delay interference unit 121, in association with the rough adjustment of the dispersion compensation amount performed by the first dispersion amount adjusting unit 212A.

When the number of errors is below the allowable value (Yes route at step B3), the feedback control on the phase control amount by the delay interference controlling unit 201 similar to that according to the first embodiment is switched ON at this point of time because the VDC control amount by the VDC controlling unit 212 and the phase control amount by the delay interference controlling unit 201 are almost appropriate values (fine adjustment of the delay interferometer, step B7).

Namely, the optical phase difference detecting circuit 201d detects an optical phase difference between a component delayed by one bit time and an optical signal to be interfered therewith in the delay interferometer 121, and outputs a result of the detection to the delay interference controlling circuit 201. The delay amount controlling circuit 201c controls the delay interferometer 121 so that the optical phase difference detected by the optical phase difference detecting circuit 201d is zero.

To follow a change in dispersion amount due to a fluctuation in temperature or the like during the operation of the apparatus, the VDC controlling unit 212 searches the optimum dispersion compensation amount in the hill-climbing method according to the number of errors from the received data processing unit 124 (VDC fine adjustment, step B8). As this, it is possible to obtain the optimum phase control amount and dispersion compensation amount, and to start the service operation (step B9).

Accordingly, the above delay amount controlling circuit 201c in the delay interference controlling unit 201 is a second phase controlling unit for performing a control to stabilize the optical phase control amount in the delay interferometer 121 on the basis of a demodulated electric signal from the photoelectric converting unit 122 when the number of errors is below the predetermined value. The VDC controlling unit 212 has a function as a second dispersion compensation controlling unit 212B for performing a control on the dispersion compensation amount in the VDC 150 so that the number of error is the minimum after the optical phase control by the delay interference controlling unit 201 as being the second phase controlling unit is started.

The optical receiving apparatus 310 sets the phase controlling amounts in the delay interferometers 141-1 and 141-2 to suitable values, then sets and controls the dispersion compensation amounts and the phase control amounts, as does the above mentioned optical receiving apparatus 210. At this time, the VDC controlling unit 312 searches a dispersion amount at which the number of errors is below the allowable value, in association with the phase control in each of the interferometers 141-1 and 141-2 by the delay amount controlling circuit 301B in the delay interference controlling unit 301.

When a dispersion compensation amount at which the number of errors is below the allowable value is obtained in the search as a result of that the phase control amount of either one of the two interferometers 141-1 and 141-2 is increased (refer to step 6B), it can be determined that the dispersion compensation amount is almost appropriate. In which case, this dispersion compensation amount is fixed as a result of the rough adjustment, the phase control amount in the other one of the two interferometers 141-1 and 141-2 is increased, and a phase control amount at which the number of errors is below the permitted value is searched (rough adjustment of the phase control amounts in the delay interferometers 141-1 and 141-2). In other words, the VDC controlling unit 312 has a function as a first dispersion compensation controlling unit 312A, and the delay amount controlling circuit 301B in the delay interference controlling unit 301 functions as a first phase controlling unit.

When phase control amounts in the delay interferometers 141-1 and 141-2 are obtained together with the dispersion compensation amount at which the number of errors is below the allowable value as above, the feedback control on the phase control amounts by the delay interference controlling unit 301 is switched ON (fine adjustment of the phase control amounts) like the process at step B7 in FIG. 27, and the optimum dispersion compensation amount is searched by the VDC controlling unit 312 (VDC fine adjustment) like the process at step B8.

Accordingly, the VDC controlling unit 312 has a function as a second dispersion compensation controlling unit 312B, and the delay amount controlling circuit 301B in the delay interference controlling unit 301 functions as a second phase controlling unit.

In the optical receiving apparatuses 210 and 310 according to the second embodiment, the VDC controlling units 202 and 302 can advantageously set the VDCs 150 in the optical receiving apparatuses 210 and 310, efficiently and optimally, at the time of initial setting (start of the system operation, protection, path switching) and during the system operation. Further, when the delay interference controlling units 201 and 301 for controlling the phase control amounts in the delay interferometers 121, and 141-1 and 141-2 are provided, the controls by the delay interference controlling units 201 and 301 and the VDC controlling units 202 and 302 can be quickly stabilized.

The clock signal and the number of errors, which are feedback elements of the VDC controlling units 212 and 312, can be captured from devices already integrated in the respective optical receiving apparatuses such as the regenerating circuits 123, and 143-1 and 143-2, the received data processing units 124 and 145 and the like through interfaces. This allows realization of a low-cost, small-sized apparatus.

[C] Others

It is noted that the present invention is not limited to the above examples, but may be modified in various ways without departing from the spirit and scope of the invention.

In the above embodiments, the optical receiving apparatuses adopt differential binary phase modulation and differential quaternary phase modulation. However, the present invention may be applied to an optical receiving apparatus adopting differential M-ary phase modulation in which $M=2^n$ where n is a natural number not less than three.

Disclosure of the above embodiments allows a person skilled in the art to manufacture the apparatuses according to this invention.

What is claimed is:

1. An optical receiving apparatus performing a receiving process on an optical signal undergone differential M-ary phase modulation in which $M=2^n$ where n is a natural number, said optical receiving apparatus comprising:
    a variable dispersion compensation unit for variably performing dispersion compensation on the received optical signal;
    a delay interference unit for performing a delay interference process on the optical signal from said variable dispersion compensation unit;
    a photoelectric conversion detecting unit for performing photoelectric conversion detection on the optical signal from said delay interference unit to output a demodulated electric signal demodulated from the differential M-ary phase modulated optical signal;
    a clock signal extracting unit for extracting a clock signal from the demodulated electric signal fed from said photoelectric conversion detecting unit; and
    a dispersion compensation controlling unit for controlling a dispersion compensation amount in said variable dispersion compensation unit on the basis of the clock signal extracted by said clock signal extracting unit.

2. The optical receiving apparatus according to claim 1, wherein said delay interference unit performs the delay interference process to make one branched component delayed by one bit of the optical signal from said variable dispersion compensation unit and the other branched component undergone an optical phase control of the same interfere with each other;
    said optical receiving apparatus further comprises a delay interference controlling unit for controlling an optical phase control amount in said delay interference unit on the basis of the demodulated electric signal from said photoelectric conversion detecting unit.

3. The optical receiving apparatus according to claim 2, wherein said delay interference controlling unit controls the delay interference process after said dispersion compensation controlling unit starts the control on said variable dispersion compensation unit.

4. The optical receiving apparatus according to claim 2 further comprising an error monitor for detecting the number of errors from the demodulated electric signal fed from said photoelectric conversion detecting unit;
    wherein said dispersion compensation controlling unit controls said variable dispersion compensation unit on the basis of the clock signal when an operation of said optical receiving apparatus is started, said delay interference controlling unit controls the delay interference process after the control on said variable dispersion compensation unit is started, and said dispersion compensation controlling unit controls said variable dispersion compensation unit according to the number of errors detected by said error monitor during a steady operation of said optical receiving apparatus.

5. The optical receiving apparatus according to claim 2, wherein said optical receiving apparatus performs the receiving process on an optical signal undergone differential binary phase shift keying;

said delay interference unit branches the optical signal from said variable dispersion compensation unit, delays one component of the branched optical signal by one bit while controlling the other component of the same with an optical phase control amount of zero, and makes the branched component delayed by one bit and the branched component controlled with the optical phase control amount of zero interfere with each other; and said delay interference controlling unit controls said delay interference unit on the basis of the demodulated electric signal from said photoelectric conversion detecting unit so that the optical phase control amount is stabilized at zero.

6. The optical receiving apparatus according to claim 2, wherein said optical receiving apparatus performs the receiving process on an optical signal undergone differential quaternary phase shift keying;

said delay interference unit comprises:
a branching unit for branching the optical signal from said variable dispersion compensation unit into two;
a first interferometer for further branching one of the branched optical signals branched by said branching unit into two component, delaying one of the two components by one bit while controlling the other component with an optical phase control amount of $\pi/4$, and making the component delayed by one bit and the component controlled with the optical phase control amount of $\pi/4$ interfere with each other;
a second interferometer for further branching the other of the branched optical signal branched by said branching unit into two components, delaying one of the two components by one bit while controlling the other component with an optical phase control amount of $-\pi/4$, and making the component delayed by one bit and the component controlled with the optical phase control amount of $-\pi/4$ interfere with each other; and said delay interference controlling unit controls said first interferometer and said second interferometer on the basis of the demodulated electric signal from said photoelectric conversion detecting unit so that the optical phase control amount in said first interferometer and the optical phase control amount in said second interferometer are stabilized at $\pi/4$ and $-\pi/4$, respectively.

7. An optical receiving apparatus for performing a receiving process on an optical signal undergone differential M-ary phase modulation in which $M=2^n$ where n is a natural number, said optical receiving apparatus comprising:
a variable dispersion compensation unit for variably performing dispersion compensation on the received optical signal;
a delay interference unit for performing a delay interference process on the optical signal from said variable dispersion compensation unit;
a photoelectric conversion detecting unit for performing photoelectric conversion detection on the optical signal from said delay interference unit to output a demodulated electric signal demodulated from the differential M-ary phase modulated optical signal;
an error monitor for detecting the number of errors from the demodulated electric signal fed from said photoelectric conversion detecting unit;
a first dispersion compensation controlling unit for controlling said variable dispersion compensation unit to roughly adjust a dispersion compensation amount in said variable dispersion compensation unit when an operation of said optical receiving apparatus is started so that the number of errors detected by said error monitor is below a predetermined value;
a first phase controlling unit for roughly adjusting an optical phase control amount in said delay interference unit in association with the adjustment of the dispersion compensation amount performed by said first dispersion compensation controlling unit;
a second phase controlling unit for performing a control to stabilize the optical phase control amount in said delay interference unit on the basis of the demodulated electric signal from said photoelectric conversion detecting unit when the number of errors is below the predetermined value; and
a second dispersion compensation controlling unit for performing a control on the dispersion compensation amount in said variable dispersion compensation unit after the optical phase control by said second phase controlling unit is started so that the number of errors is minimum.

8. A method for controlling an optical receiving apparatus for performing a receiving process on an optical signal undergone differential M-ary phase modulation in which $M=2^n$ where n is a natural number, said optical receiving apparatus comprising a variable dispersion compensation unit for variably performing dispersion compensation on the received optical signal, a delay interference unit for performing a delay interference process to make one branched component delayed by one bit of the optical signal from said variable dispersion compensation unit and the other branched component undergone an optical phase control of the same interfere with each other, a photoelectric conversion detecting unit for performing photoelectric conversion detection on the optical signal from said delay interference unit to output a demodulated electric signal demodulated from the differential M-ary phase modulated optical signal, a clock signal extracting unit for extracting a clock signal from the demodulated electric signal fed from said photoelectric conversion detecting unit, and an error monitor for detecting the number of errors from the demodulated electric signal fed from said photoelectric conversion detecting unit, said method comprising the steps of:
controlling a dispersion compensation amount in said variable dispersion compensation unit on the basis of the clock signal extracted by said clock signal extracting unit when an operation of said optical receiving apparatus is started;
controlling an optical phase control amount in said delay interference unit on the basis of the demodulated electric signal from said photoelectric conversion detecting unit after the control on the dispersion compensation amount is started; and
controlling the dispersion compensation amount in said variable dispersion compensation unit according to the number of errors detected by said error monitor during a steady operation of said optical receiving apparatus.

9. A method for controlling an optical receiving apparatus for performing a receiving process on an optical signal undergone differential M-ary phase modulation in which $M=2^n$ where n is a natural number, said optical receiving apparatus comprising a variable dispersion compensation unit for variably performing dispersion compensation on the received optical signal, a delay interference unit for performing a delay interference process to make one branched component delayed by one bit of the optical signal from said variable dispersion compensation unit and the other branched component undergone an optical phase control of the same interfere with each other, a photoelectric conversion detecting unit for performing photoelectric conversion detection on the optical signal from said delay interference unit to output a demodulated electric signal demodulated from the differential M-ary phase modulated optical signal, and an error monitor for detecting the number of errors from the demodulated electric signal fed from said photoelectric conversion detecting unit, said method comprising the steps of:

adjusting roughly a dispersion compensation amount in said variable dispersion compensation unit and an optical phase control amount in said delay interference unit so that the number of errors detected by said error monitor is below a predetermined value;

starting a control to stabilize the optical phase control amount in said delay interference unit on the basis of the demodulated electric signal from said photoelectric conversion detecting unit when the number of errors is below the predetermined value; and starting a control on the dispersion compensation amount in said variable dispersion compensation unit so that the number of errors is minimum.

10. The method for controlling an optical receiving apparatus according to claim 9, wherein, after an initial value of the optical phase control amount in said delay interference unit is set, a dispersion compensation amount at which the number of errors detected by said error monitor is below the predetermined value is searched by said variable dispersion compensation unit; and when a dispersion compensation amount at which the number of errors detected by said error monitor is below the predetermined value is not obtained by said variable dispersion compensation unit, the optical phase control amount in said delay interference unit is increased from the initial value by a predetermined amount at a time until a dispersion compensation amount at which the number of errors detected by said error monitor is below the predetermined value is obtained.

* * * * *